United States Patent [19]

Farrell et al.

[11] Patent Number: 5,241,541
[45] Date of Patent: Aug. 31, 1993

[54] BURST TIME DIVISION MULTIPLEX INTERFACE FOR INTEGRATED DATA LINK CONTROLLER

[75] Inventors: Joseph K. Farrell, Boca Raton, Fla.; Jeffrey S. Gordon, Centreville, Va.; Daniel C. Kuhl, Delray Beach, Fla.; Timothy V. Lee; Tony E. Parker, both of Boca Raton, Fla.

[73] Assignee: International Business Machines Corporation, Armonk, N.Y.

[21] Appl. No.: 495,012

[22] Filed: Mar. 15, 1990

[51] Int. Cl.⁵ .............................................. H04J 3/24
[52] U.S. Cl. .................................. 370/94.1; 370/100.1
[58] Field of Search ................... 370/95.1, 100.1, 94.1, 370/110.1, 85.1, 84, 58.1

[56] References Cited

U.S. PATENT DOCUMENTS

| | | | |
|---|---|---|---|
| 3,851,104 | 11/1974 | Willard et al. | 179/15 |
| 3,928,727 | 12/1975 | Roche | 179/15 |
| 3,975,712 | 8/1976 | Hepworth et al. | 340/147 |
| 4,485,470 | 11/1984 | Reali | 370/100 |
| 4,627,050 | 12/1986 | Johnson et al. | 370/85 |
| 4,642,805 | 2/1987 | Dumas et al. | 370/58 |
| 4,697,263 | 9/1987 | Beaufoy | 370/94.1 |
| 5,121,390 | 6/1992 | Farrell et al. | 370/94.1 |

OTHER PUBLICATIONS

J. W. Cannon et al, IBM Technical Disclosure Bulletin, vol. 24, No. 2, Jul. 1981, pp. 1187–1191, BC879-0276.

Primary Examiner—Douglas W. Olms
Assistant Examiner—Shick Hom
Attorney, Agent, or Firm—Winfield J. Brown, Jr.; Robert Lieber

[57] ABSTRACT

Subject burst time division multiplex interface connects circuits which perform "layer 1 (L1)" line control functions relative to a data communication network with devices which perform "Layer 2 (L2)" link control functions relative to the same network (L1 and L2 defined by OSI Specifications of the International Standards Organization). The interface is characterized by presentation of bursts of readiness indicating pulses from the L1 circuit to the L2 device during each basic time division multiplex time slot. The pulses indicate readiness of the circuits for data bit exchange, and separate time overlapped bursts are sent to indicate readiness of the circuits to send and receive data bits. Each burst contains a varied number of pulses ranging from 0 to n (where n is greater than 2, and in the disclosed embodiment equals 8). The bursts are positioned in a window of time occupying a fraction of the slot interval close to the end of each slot. This allows the L2 device to perform state swapping operations during the remainder of the slot to prepare for burst exchanges with different network channels to which the slots are allocatable and to be able to devote maximum processing time to performance of L2 tasks required relative to the channels. The channels operate under various communication protocols; e.g. High-Level Data Link Control (HDLC), Link Access Procedure-D (LAP-D), clear voice, etc. Slot time spacings are variable by the L1 circuits to adjust to signalling conditions in the network.

25 Claims, 7 Drawing Sheets

BTDM LAYER ONE LOGIC

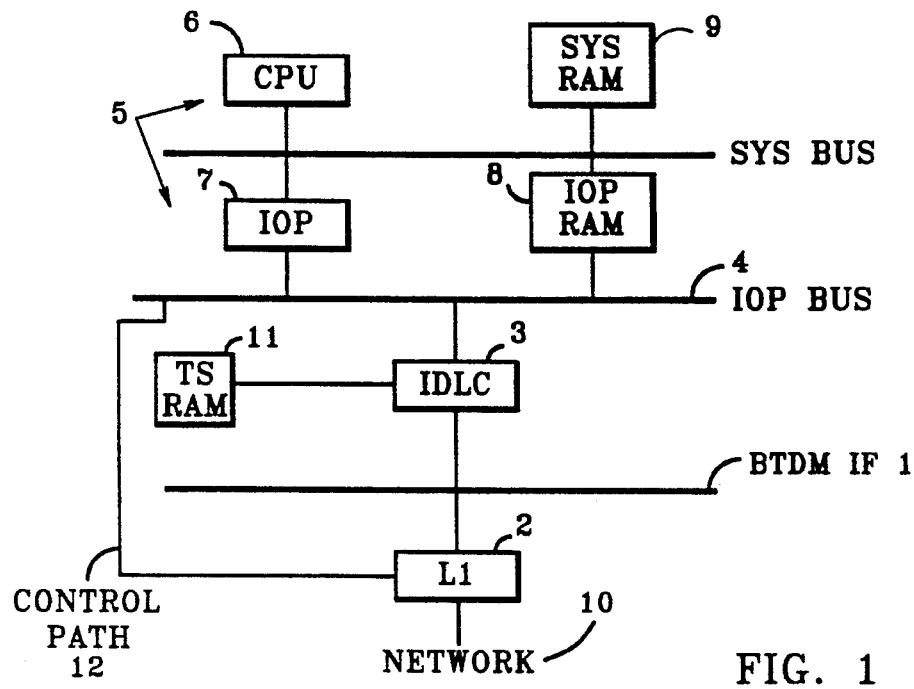
FIG. 1
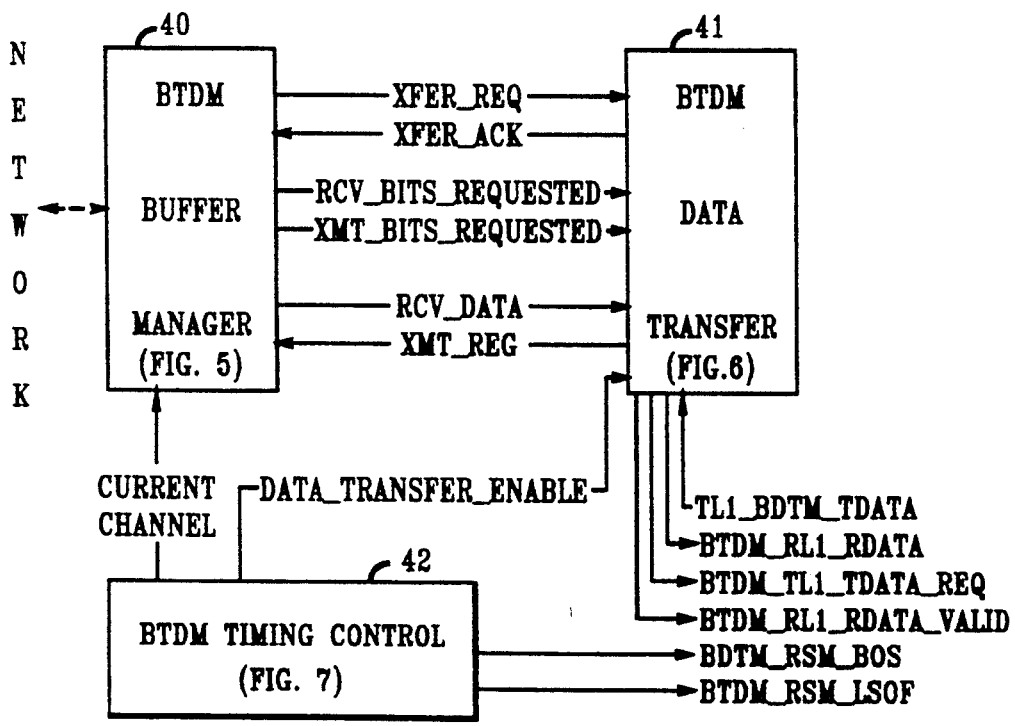
FIG. 2 BTDM LAYER ONE LOGIC

N — PROCESSING FOR SLOT N
P — PREFETCHING PART OF CCR ("CHL TYPE")
S — SWAPPING STATES
H — HALT ELEMENTS FOR GLOBAL SWAP
R — READ FULL CCR/HPCR
BOS — BEGINNING OF SLOT INDICATION
XXXX — BTDM DATA TRANSFER PHASE
GLOBAL — VARIABLES COMMON TO XMIT & RCV

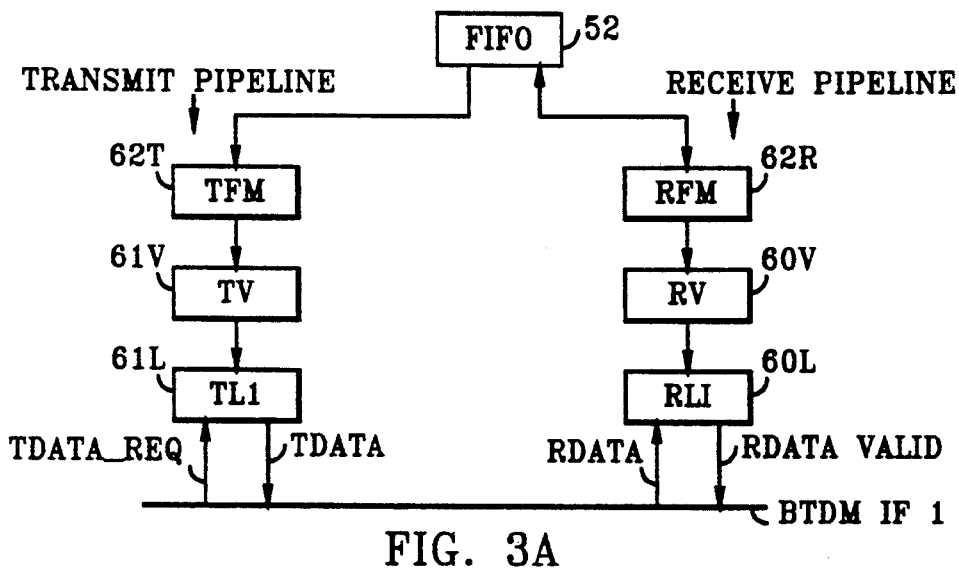
FIG. 3A
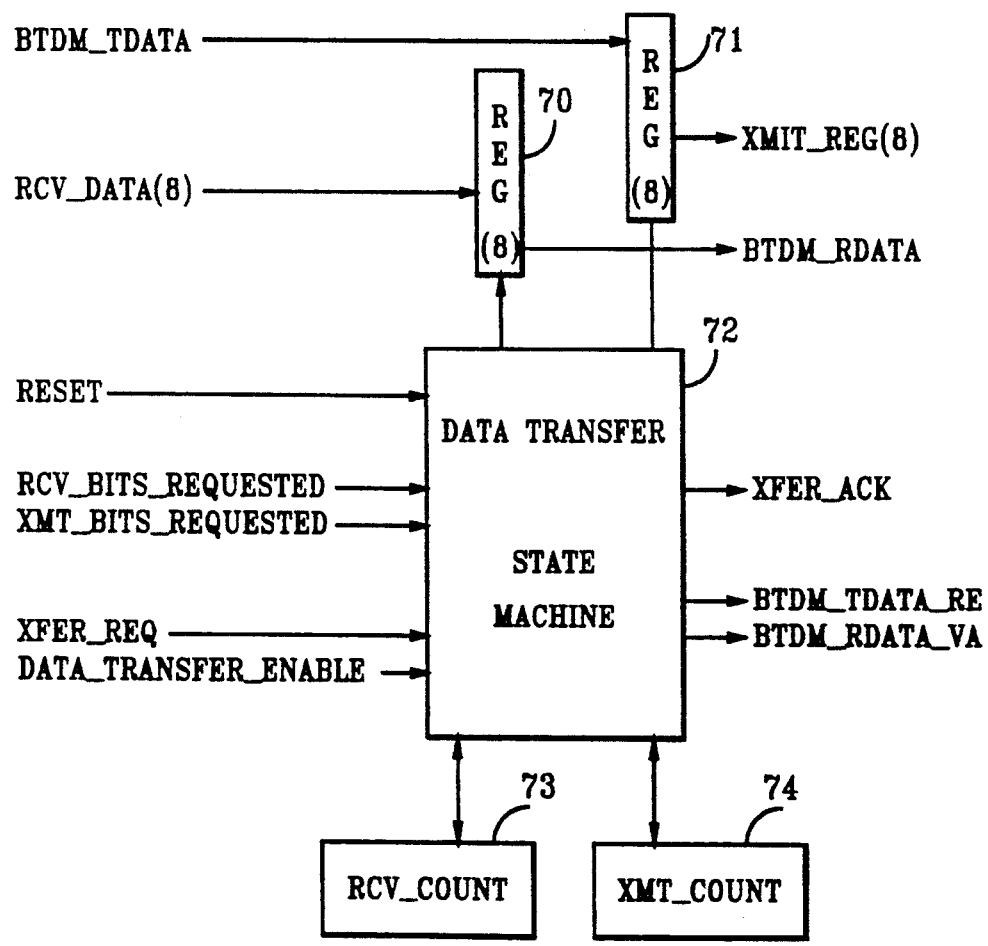
FIG. 5        BTDM DATA TRANSFER

BTDM BUFFER MANAGER

BTDM TIMING CONTROL LOGIC AND STATE MACHINE

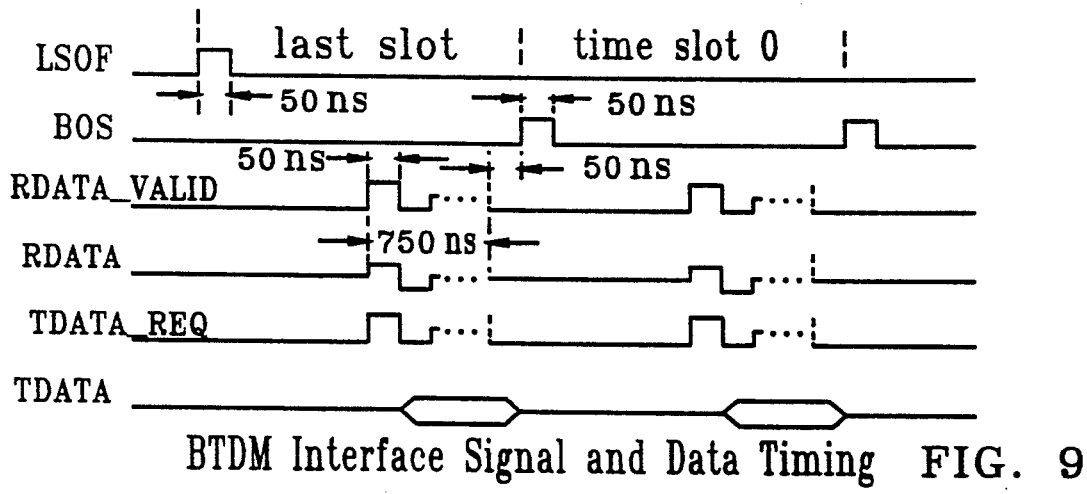
BTDM Interface Signal and Data Timing   FIG. 9
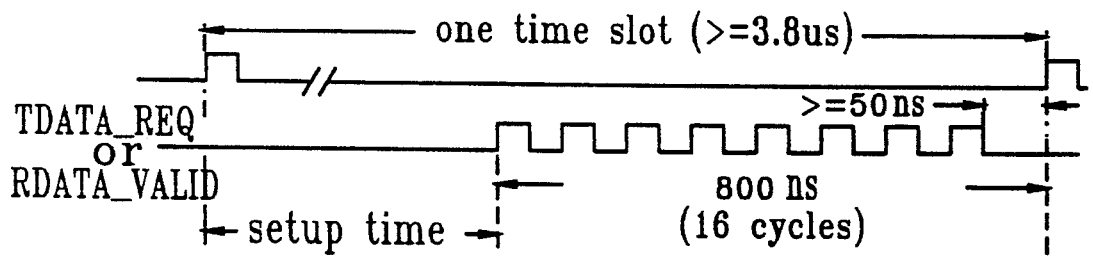
Data Stream Timing with Respect to Time Slot   FIG. 10
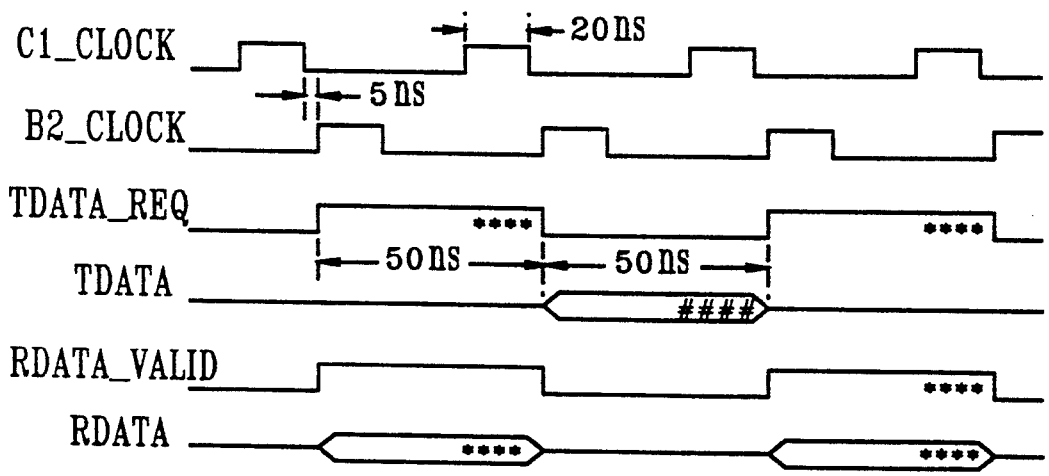
Data Bit Timing with Respect to Clocks   FIG. 11

BURST TIME DIVISION MULTIPLEX INTERFACE FOR INTEGRATED DATA LINK CONTROLLER

CROSS-REFERENCES TO RELATED PATENT APPLICATIONS

1. Application Ser. No. 07/495,232, filed Mar. 15, 1990, by J. Farrell et al, entitled "Integrated Data Link Controller With Autonomous Logical Elements", concerns organization of a high speed data link control device into multiple autonomous elements providing pipelining effects for more efficient operation.

2. Application Ser. No. 07/495,810, now issued U.S. Pat. No. 5,121,390, filed Mar. 15, 1990, by J. Farrell et al, entitled "Integrated Data Link Controller With Synchronous Link Interface And Asynchronous Host Processor Interface", concerns partitioned construction of the above-mentioned data link control device into synchronous and asynchronous sections providing distinct advantages over comparable prior devices in respect to internal and external signal transfer.

3. Application Ser. No. 07/495,821, filed Mar. 15, 1990, by J. Farrell et al, entitled "Integrated Data Link Control With Dynamic Hyperchannel Mapping" concerns a feature of the subject device relating to its capability for dynamically and variably configuring time channels on ISDN (Integrated Systems Data Network) links into higher throughput channels called "HyperChannels".

BACKGROUND OF THE INVENTION

This invention relates to signalling interfaces between Layer 2 (L2) and Layer 1 (L1) communication processes as defined by Open Systems Interconnection (OSI) specifications of the International Standards Organization (OSI). L2 processes provide data link control functions, whereas L1 processes relate directly to physical operations by which communication signals are sent and received. High speed telecommunication applications associated with multiplex transmission of voice and data, for instance signalling applications in primary rate ISDN (Integrated Systems Digital Network) environments of the type contemplated by CCITT specifications referenced herein, require efficient handling of signals between L2 and L1 processes to sustain required transmission signalling speeds. The present invention relates to an L1/L2 interface with improved signal transfer efficiency. The subject interface operates in a burst time division multiplex (BTDM) mode which is the basis for its improved efficiency.

PRIOR ART

Time division multiplex interfaces between data link control devices performing L2 processes and circuits or devices performing L1 operations—as disclosed in U.S. Pat. Nos. 4,493,051 and 4,504,901, assigned to the assignee of the present application —operate in basic recurrent time slots to transfer signals in multiple communication channels between respective L2 and L1 devices or circuits. In general, such time slots recur at fixed intervals and prior link control devices have been constrained to exchange at most one bit of information in any slot.

The integrated data link control (IDLC) device disclosed in the copending patent applications cross-referenced above performs multiple L2 processes and contains capabilities to overcome the prior restrictions on bit exchange. The present invention is directed to a unique burst time division multiplex (BTDM) interface, for coupling L2 devices with adaptive L1 circuitry, which allows the full capabilities of IDLC devices to be utilized.

SUMMARY OF THE INVENTION

The subject BTDM interface, and associated L1 circuits for controlling same, provides both a discrete logical and physical point of separation between L2 and L1 processes. It uses a small number of lines to sustain high speed information signal transfers (up to 2.048 Mbps) between L2 and L1 devices/circuits. The interface is designed to allow the L1 circuits to accommodate varied time division slot and frame durations at its communication line interface, and to transfer varied numbers of bit signals in any slot, so as to minimize possibilities of underrun/overrun (underrun in transmissions to communication line interfaces and overrun in receptions from the latter). Furthermore, the interface is designed to allow adaptive L1 circuits to vary rates of bit transfer so as to keep up with rates fixed by timing conditions at the network interface, regardless of any drift between local clocks in the L1 circuits and clocks at remote nodes with which communications are being conducted.

The last-mentioned feature allows L1 circuits of appropriate design to pace the timing of slot recurrence and bit transfer requests at the BTDM interface so as to effectuate what is presently termed "positive slip" clocking relative to remote communication sources and sinks to which the L1 circuits couple via communication media. In systems not so paced, normal drift between local and remote network clocks eventually result in errors due to loss of synchronism and corresponding slippage resulting in loss of a time division slot.

This is minimized presently by operating the BTDM interface at a fixed pace slightly faster than the nominal rate at the Network (communication line) interface, and varying the numbers of bits transferred at the BTDM interface so that the number so transferred during any fundamental period of BTDM time division slot recurrence will never be less than the number which could be transferred at the network interface in any corresponding fundamental recurrence period of the latter.

The basis for the adaptability features mentioned above (whereby durations of slot recurrence frames, and durations of slots and number of slots in any frame could be varied by the interface controlling circuits) is in the technique used for indicating slot beginnings.

In the presently disclosed embodiment, a frame consists of 32 slots. The L1 circuits which control the interface timing provide pulses indicating beginnings of interface slots. However, the last slot of frame (LSOF) pulse, indicating the beginning of the last slot of a frame, is presented on a line separate from the one on which beginning of slot (BOS) pulses are presented; the latter pulses indicating the beginnings of all slots other than the last slots of frames.

At the L2 device side of the interface, each LSOF pulse is used to reset a slot counter which is then incremented by the BOS pulses, so that the slots appearing within a frame have ordered numbering. Presently, this means that the slots within a frame would be numbered from 0 to 31, but those skilled in the art will recognize that it would be simple to have the L1 circuits truncate any frame to delete one or more slots at the end of the frame (a possible use being to allow for certain end slots to be used as low bandwidth signalling channels not recurrent in every slot frame).

It is also easy to appreciate that the BOS and LSOF pulses need not have fixed spacing (although they do in the presently disclosed embodiment), and therefore that durations of individual slots could be varied (a possible use being to shorten slots associated with idle communication channels and lengthen slots associated with active channels).

In the present invention, data is transferred bit serially during any slot. A feature of the invention is that data bit transfers during any slot are time compressed into a short duration portion of the slot period (less than 133 of the slot period), and are varied in length so that from 0 to 8 bits are transferred in each direction depending upon network requirements (i.e. the number in one direction having no relation to the number in the opposite direction). The transfer phase of each slot is positioned near the end of the slot. Accordingly, it would be rather simple to truncate any idle slot, in which no data is being transferred in either direction, by advancing the next BOS or LSOF pulse in time to the beginning of the transfer phase of the idle slot (although this is not done in the presently disclosed embodiment).

The BTDM is designed to support ISDN primary or basic rate as principal L1 protocols, and HDLC as principal L2 protocol, but is not restricted to or otherwise confined by such support. Thus, where prior data link control interfaces contemplate bit throughput rates on the order of 350,000 received or transmitted bits per second, the subject interface easily accommodates bit transfer rates in excess of 2 million received and transmitted bits per second overall, and bit transfer rates of up to 64,000 bits per second in any basic time slot (as needed for sustaining full duplex voice links).

Another feature of the present interface and associated L1 circuit architectures is that transfers at the BTDM interface are made during sharply compressed windows of time within time division slot periods so as to provide the attached L2 devices with maximal time to complete operations on data received from the L1 circuits in the previous slot as well as on data to be transmitted to the L1 circuits during the current slot.

OBJECTS OF THE INVENTION

An object of the invention is to provide a data transfer interface for efficiently isolating data processing systems from external sources of synchronous data signals circuits, whereby time dependencies of the system relative to the external sources are lessened.

Another object is to provide an interface as just characterized which provides non-slip operation relative to external sources with randomly drifting data signal clocks.

Another object is to provide an interface as just characterized which allows for accommodation of more channels to external data signal sources than would otherwise be permissible.

Another object is to provide an interface as just characterized wherein data transfers between each external source and an associated system channel are time compressed into short duration bursts within larger periods of time dedicated to each channel, whereby the system is given maximal time to adapt dynamically to channels wherein data is transferring with differing protocols and formats from channel to channel.

Another object is to provide a data transfer interface between a data processing system and a data communication network which facilitates high throughput full duplex data transfer between multiple network channels and corresponding data transfer channels in the system.

Another object is to provide a time division data transfer interface in which frames of recurrent time slots are indicated by pulses presented by circuits which control the pacing of data transfer operations at the interface, and beginnings of slots within frames are indicated by other pulses distinguishable from those which indicate frames.

A related object is to provide a data transfer interface as characterized above which would be easily adapted for variably truncating frames and/or slot durations within frames, so as to allow for more efficient use of interface bandwidth.

Another object is to provide an intermediate data communication interface, between a data processing system and circuits operating relative to a communication node in a time division multiplex data communication network, which minimizes possibilities for overrun and/or underrun conditions to occur relative to any time division channel of the network.

Another object is to provide an intermediate interface as characterized above which forms a point of isolation relative to the respective network node and a data processing system such as to facilitate branched connections between the system and plural networks.

Another object is to provide an intermediate time division multiplex data transfer interface, between circuits connecting to a connection node of a time division multiplex data communication network and devices providing data processing services relative to the network, characterized in that the rate of recurrence of time division slots at the intermediate interface is faster than that at the network connection node, so that possibilities of overrun or underrun conditions developing in any channel operating through said slots are minimized.

Another object is to provide an intermediate time division multiplex data transfer interface, as just characterized, which operates in a burst mode, in which data is transferred bit serially between said circuits connecting to said network node and said devices providing data communication service, and a variable number of from 0 to n bits may be transferred during each time division slot at the intermediate interface under control of said circuits, where n is greater than 2, so that the number of bits transferred invariably keeps pace with the rate of bit transfer at the network node interface, regardless of clocking conditions between said node and remote nodes of said network.

Another object is to provide such an intermediate interface wherein the bit transfer activity during each time division slot is compressed into a short duration burst occupying a small part of the slot period, whereby the rest of each slot period can be used to prepare said devices providing communication services for adjusting to varied protocol processing requirements of channels to which the slots are assigned.

These and other objects, features, advantages and benefits of the present invention will be more fully understood and appreciated by considering the following description and claims.

DESCRIPTION OF DRAWINGS

FIG. 1 is a block diagram of a data processing node in a typical primary rate ISDN network environment, illustrating the "intermediate" position of the subject BTDM interface in the system equipment at the node.

FIG. 2 is a high level block diagram of parts of the L1 circuits controlling the operations of the subject interface.

FIG. 3a is a schematic of parts of the IDLC device which form synchronous pipelines for processing communication data in transit relative to the subject BTDM interface.

FIGS. 5–7 are schematic block diagrams of unit portions of the BTDM control circuits shown in FIG. 2; FIG. 5 illustrating the BTDM buffer manager unit, FIG. 6 the BTDM data transfer unit, and FIG. 7 the BTDM timing control unit.

FIGS. 9–11 are timing diagrams illustrating timings of signals on the interface lines shown in FIG. 8.

DETAILED DESCRIPTION

1. TERMS, DEFINITIONS AND CONCEPTS

Figure 3:
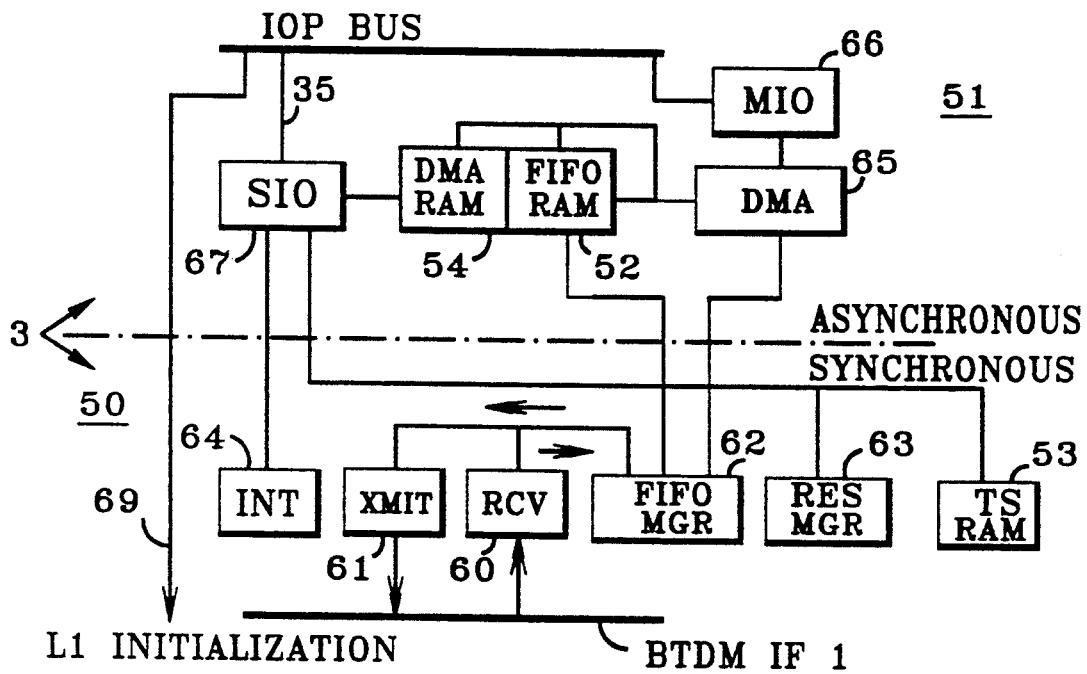
FIG. 3 is a high level block diagram of the internal logical organization of the IDLC device, illustrating its major logical partitions and associated RAM memory units.

Terms used herein have the following intended meanings.

Autonomous Logical Element

As used presently, means a special purpose logical circuit arrangement having data inputs and outputs and a finite repertoire of logical states, typically a set of logic circuits containing one or more logical state machine circuits, and which upon being set to one of its states sequences to other states as a function of external conditions or events, and while so sequencing performs logical functions relative to said data inputs and outputs in a manner such that its operations relative to other elements to which it connects either for exchanging data or receiving external state control are performable in parallel and simultaneous with operations of such other elements.

CCITT

The International Telegraph and Telephone Consultative Committee; an organization formed originally under the 20 International Telecommunications Union (ITU) treaty of 1865, and now a specialized agency of the United Nations. The organization generates publications referred to elsewhere herein defining international standards for telecommunication protocols. Participants include telecommunications carriers such as AT&T and GTE Telenet.

CMOS

Complementary Metallic Oxide Silicon as used in contemporary integrated semiconductor devices.

CMOS 2

A particular form of CMOS technology accommodating line spacings of 1 micron and providing circuit switching speeds of 1 ns for a 2 input AND gate [refer to: (1) IEEE J. Solid State Circuits, V. 23, N. 5 Oct. 1988, Pp. 1095-11, Wong, D. T. et al, "11-ns 8K×18 CMOS Static RAM With 0.5-mu m Devices"; (2) Proc. Of The Custom Integrated Circuits Conf. 1987, by IEEE, Pp. 248–252, Aldridge, A. W. et al, "40K Equivalent Gate CMOS Standard Cell Chip"; (3) Proc. Of The Custom Integrated Circuits Conf. 1987, by IEEE, Pp. 245–247, Hornung, F et al, "A Versatile VLSI Design System For Combining Gate Array And Standard Cell Circuits On The Same Chip"]

Host System

A main data processing unit or system in a data processing network.

H-channel (Hereafter termed HyperChannel) A form of high speed time division channel defined by the CCITT in its I.412 definitions [refer to: CCITT Red Book, Vol. III, Fascicle III.5, "Integrated Services Digital Network (ISDN), Recommendations of the Series I, Geneva 1985].

HDLC (High Level Data Link Control)

Generic term encompassing LapB, LapD and SDLC protocols defined herein.

HyperChannel

See H-channel above.

IOP System

An input-output processor operating under control of a main (or host) processor.

ISDN

Integrated Services Digital Network, as defined by CCITT [Refer to: CCITT Red Book, VIII, Fascicle III.5 above].

ISDN Layers 1 and 2 (L1, L2)

Respectively, the physical and data link control layers of logical signal handling in ISDN networks; the physical layer attending to transmission and reception of signals on network lines and activation and deactivation of network connections on such lines; the link control layer concerned with error checking and other higher level functions relative to the physical layer [refer to: CCITT Red Book, VIII, Fascicle III.5 above, Part IV, Sections 3 and 4].

LAPB

A particular data link protocol for X.25 networks, defined by CCITT X.25 Recommendation [refer to: CCITT Fascicle VIII.3 Recommendation X.25, "Interface Between Data Terminal Equipment (DTE) And Data Circuit-Terminating Equipment (DCE) For Terminals Operating In The Packet Mode And Connected To Public Data Networks By Dedicated Circuit, Geneva 1976, Amended 1980 and 1984].

LAPD

A particular link access protocol for D channels as defined by CCITT Recommendation Q.920 [Refer to: CCITT Fascicle III.5 above, Part IV, Section 4.]

Motorola 68000 bus

Bus used by Motorola 68000 microprocessors to attach to memory and other peripherals [refer to: M68000 8-/16-/32 Bit Microprocessors User's Manual, sixth ed., Prentice Hall, 1989, Section 5 (Signal And Bus Operation Description)].

Network Nodes

Points at which terminal equipments attach to a network.

Physical Interface

Layer 1 interface [see ISDN Layers 1 and 2 above].

Random Access Memory

SDLC

Synchronous Data Link Control; the link control protocol used in SNA [refer to: IBM Publications GA27-3093-3, "Synchronous Data Link Control—Concepts", 1979, 1986]

SNA

Systems Network Architecture [refer to: IBM Publication GC30-3072-3, "Systems Network Architecture—Concepts And Products", 1981, 1986]

Finite State Machine

A logical circuit having a finite repertoire of possible stable operating positions or stages, each position or stage yielding a characteristic action or output, and undergoing transitions between such positions or stages as a function of external stimuli.

2. SYSTEM OVERVIEW

FIG. 1 illustrates a typical system application environment of the subject burst time division multiplex interface (hereafter BTDM) interface. The system shown here represents the equipment at a communication and processing node in a primary rate ISDN network. BTDM interface 1 connects circuits 2 (called layer 1 or L1 circuits) with integrated data link control (IDLC) device 3.

Device 3 connects via bus 4 to one or more external processing systems; one such being indicated generally at 5. Device 3, described in detail in the cross-referenced patent applications above which mention "Autonomous Elements" and "Synchronous Link Interface" in their titles, transfers data between the L1 circuits and the external processing system and performs certain OSI layer 2 (L2) processing functions relative to data in protocol formatted channels. As described in the cross-referenced applications, a typical external system 5 may consist of a host CPU 6 and an I/O processor (IOP) 7, having respective associated memory subsystems 8 and 9, and communicating through another bus labeled "SYS BUS".

At the BTDM interface, device 3 receives and sends data relative to network communication channels during recurrent time division slots assigned to the channels. During any slot, the number of bits sent and/or received is varied under direction of BTDM controls described later from 0 to n (n=8 presently), and the bit transfer activity in each direction is compressed into a short duration "burst window" positioned near the end of the slot (the slots in the present embodiment have durations of 3.8 microseconds, and the transfer window begins late in the slot period and lasts for only 800 nanoseconds).

At bus 4, data is transferred relative to external memory (IOP memory in the indicated embodiment) in parallel sets of up to 4 bytes. External memory is accessed by device 3 in a direct memory access (DMA) mode, and bus transfers relative to any channel are conducted in asynchronous relation to associated slot activity at the BTDM.

Circuits 2 connect between the BTDM and network for transferring data between them during cyclically recurrent time slots (the slot recurrence frame in the present embodiment consists of 32 slots assignable to 32 separate "basic" channels). Timing at the BTDM and network interfaces is slightly different in order to maintain "positive slip" operation described later. Individual slot channels may be configured dynamically for full duplex, half duplex or simplex operation in accordance with a variety of different data communication protocols.

In the presently described embodiment the rate of slot recurrence and the number of bits transferrable during each slot, are suitable for sustaining a data transfer rate of 128 Kbps in any basic channel, whereby any of the channels may be assigned to service a full duplex voice conversation path.

The term basic channel as used above is intended to distinguish such channels from "extended" channels or "HyperChannels" as described in the cross-referenced patent application having "HyperChannels" in its title. A basic channel is assigned only one slot within the BTDM and network slot recurrence frames. Extended channels and/or HyperChannels are assigned plural slots within the slot recurrence frame, and thereby have full duplex transfer rates of n times 128 Kbps, where n is the number of slots combined.

BTDM interface 1 is controlled by circuits 2 to provide time reference signals to device 3 which define beginnings of slots in each frame of slot recurrence. At interface 10, durations of basic time slots and the period of slot recurrence are fixed in relation to signalling processes on the network. At the BTDM interface 1, durations of slots and periods of slot recurrence are timed to run slightly faster than the worst case rate at the network interface (taking into account worst case drift between local and remote clocks), and this characteristic coupled with the varied rate of bit transfer within slots gives rise to "positive slip" and other beneficial effects featured by the present invention.

IDLC device 3 contains a number of local random access storage array units, including the time swap (TS) RAM array 11 (also called TSR), enabling it to provide an advanced number of layer 2 processing functions relative to each slot while meeting the throughput requirements of the network. These functions are obtained by swapping states of circuits in device 3 in synchronism with BTDM time slots assigned to active channels.

Such functions include insertion of transparency bits, frame delimiting characters and CRC check characters into data transmitted over channels configured for HDLC operation, and removal of such bits and characters from received data as well as performance of CRC checks on the data. They also include address recognition operations relative to data received in certain channels.

Device 3 contains a synchronous section of logic, which operates in synchronism with BTDM interface slots to perform the mentioned functions, an asynchronous section of logic for interfacing with external system 5, and sophisticated interruption status gathering mechanisms spanning both sections for storing channel event interruption status information and enabling the external system to retrieve such information efficiently.

The path for status information retrieval within the device is discretely separate from the path used for transferring communication data relative to external system memory, thereby reducing time dependencies on the external status retrieval processes. The status retrieval path is also used by the external system for dynamically entering information into local RAM's and configuration registers in the device for establishing initial device states, as well as varying operating configurations and activity states of the device relative to individual channels.

A separate external control path 12 allows the external system to initialize and configure the L1 circuits 2. Plural slots in each period of recurrence are assignable Device 3 contains several local memories, including a time swap RAM (TSR) 10, performs OSI Layer 2 processing tasks and exchanges data relative to external memory 8.

Data processing services provided to users of such systems and network nodes may include so-called "voice-mail" services (centralized storage and forwarding of voice messages for telephone users) and access to public or private databases (law libraries, patent libraries, etc.). In the presently contemplated environment, network link 10 comprises a high speed T1 or T3 digital signal communication line sustaining multiple time division channels. Although not required for effective use the subject BTDM interface, the network may be structured in conformance with ISDN requirements, and the channels of link 10 may be allocated dynamically to multiple channels of digitized voice and data signal traffic.

In such networks, signalling speeds could reach rates of 4.096 Mbits (megabits) per second full duplex on T-1 lines, and considerably higher rates on T-3 lines. Accordingly, a data link control device suitable for serving such lines should be able to operate at speeds in excess of 5 Mbits per second full duplex. The present BTDM and IDLC device architectures are capable of supporting highest full duplex rates presently contemplated for a fully occupied T-1 or T-3 line.

BTDM interface 1 is paced by beginning of slot (BOS) timing signals originating from the L1 circuits. Timing of these signals is set presently to ensure that the rate of slot recurrence at the BTDM is invariably faster than that at the network interface, and the number of bits transferred in each direction during any active slot is varied to keep up with the instantaneous rate of operation at the network interface, so that possibilities of overflow relative to receive data being transferred from the network interface to the BTDM, or underflow relative to transmit data flowing in the opposite direction, are minimized.

In more specific terms, the data buffer capacity in the L1 circuits allows for accumulation of up to 8 bits of receive data relative to any channel during one frame of network slot recurrence, and the rate of reception of bits at the network interface is such that no more than 8 bits could arrive relative to any channel during the frame. Furthermore, the amount of data transferred at the BTDM when that channel's assigned slot recurs is the same as the number of bits then accumulated, and since the BTDM slot frame rate is faster than that at the network interface, no more than 8 receive bits could have accumulated relative to any channel during any BTDM frame. Accordingly, receive data buffers in the L1 circuits will not overflow barring abnormal operation.

In the opposite direction, the number of transmit data bits transferred to any L1 transmit data buffer at the BTDM interface (there is one 8 bit capacity transmit buffer per BTDM slot) invariably equals the number of empty bit positions in the respective buffer at the beginning of that slot. Accordingly, since the BTDM slots recur faster than the network slots and the network can not transfer more than 8 bits of data in any period of network slot recurrence, the possibility of any transmit buffer becoming fully empty during a network slot frame is nil barring abnormal operation.

This action of having the BTDM slot rate lead the network slot rate, presently termed "positive slip" operation (because any drift between local and remote network clocks will not result in a negative slot slippage whereby data would be lost), constitutes one of the features of the features of the BTDM considered innovative.

Another feature of the BTDM is that data bit transfers conducted during any slot are time compressed into a short duration portion of the slot, so that most of each slot period is available to the device 3 for adapting its processing states to successive channel configurations.

In operation, at system start-up, CPU 6 initiates device 3, through its programming control path to the device local RAM's and registers mentioned earlier, and circuits 2 through path 12. Circuits 2 scan line 10 for a repetitive frame pattern and, upon detecting such, establishes internal clocking synchronism to bit, byte, channel and frame time division slots on line 10, both inbound and outbound.

Operating in the faster recurring time division frame at the BTDM, circuits 2 pass signals received from inbound channel time slots to IDLC 3 for further handling. The IDLC extracts and evaluates destination address information (ignoring signals whose destination is other than that of the local node), strips protocol and link specific information such as frame delimiters from channel and frame slots as appropriate (channels containing voice signals will be in "clear" form without delimiters), checks parity and passes the remaining information to system 5 for further processing.

Control data messages in the incoming stream may call for a response, and in such instances, information for the appropriate response is prepared in system 5 and passed to the IDLC. The IDLC adds source and destination addresses, frame delimiting signals and parity signals while passing the information along to circuits for transmittal to line 20. Via series of such bidirected messages, duplex connections are established between the local node and remote nodes, in time channels on line 10, and signals representing data and/or digitized audio information (e.g. voice) are exchanged over such connections.

Within the IDLC, processing relative to data transfers at interface 1 is essentially synchronous to the timing of channel slots at that interface, whereas processing relative to transfers of signals over bus 4 is essentially asynchronous in relation to slot timing at interface 1. Furthermore, whereas data is transferred at interface 1 in bit serial bursts of from 0 to n bits (n=8 in the present embodiment), it is transferred in byte parallel sets of m bytes at the bus interface (m=4 presently).

2. ARCHITECTURE OF L1 CONTROLS FOR BTDM INTERFACE

FIG. 2 illustrates the overall architecture of circuits incorporated in the L1 circuit unit for controlling the BTDM. The architecture of device 3, with emphasis on its operations relative o to the BTDM interface, is described in section 4 below with reference to FIGS. 3 and 4.

As shown in FIG. 2, BTDM operations are controlled by circuit elements 40, 41 and 42, respectively directing buffer management, data transfer and timing functions.

Timing control element 42 provides the mechanism for determining time switchable associations between network channels and BTDM slots, and specific timings of slots and slot recurrence frames at the BTDM. Notably, this element generates "last slot of frame" (BTDM_RSM_LSOF) and "beginning of slot" (BTDM_RSM_BOS) pulse signals relative to the subject interface. Slots recur in ordered sequence in frames, and each LSOF pulse indicates the beginning of the last slot of a frame. The BOS pulses indicate beginnings of slots within frames, other than the last slot.

Although frames and slots have fixed durations in the embodiment to be described presently, and the number of slots in each frame is fixed presently at 32, those skilled in the art should appreciate that the above arrangement of BOS and LSOF pulses needn't be so used. For example, with very slight modification, the timing element and other elements controlling the subject interface could easily be adapted to truncate any frame by advancing the timing of the LSOF pulse. This would eliminate one or more end slots in the respective frame; a possible application being to allow for efficient use of one or more slots at the end of selected frames as low speed signalling channels recurring only in those selected frames and not in all frames.

In the IDLC device 3, resource manager partition RSM uses the BOS and LSOF pulse signals to develop an internal count of frame slots referred to the last slot (i.e. a count which is reset after the last slot), and RSM applies that count as a partial addressing function relative to state swapping and other processes conducted in the synchronous section of device 3.

In the present timing circuits, rates of slot and frame recurrence at the BTDM interface are fixed at a pace slightly faster than "worst case" rates of recurrence of corresponding time slots and frames at the network interface. Also, in the presently disclosed buffer management and data transfer control circuits, bit buffer capacity per channel is tailored to worst case (highest speed) rates of bit transfer per frame at the network interface so as to allow for accumulation of a maximum number of buffered bits per channel during any frame, and the numbers of bits transferred in each direction at the BTDM interface, per channel slot per frame, are varied in accordance with buffer occupancy and vacancy conditions so that the maximum possible number of bits is always being transferred in each direction relative to each set of channel buffers.

The effect of this is that the transfer process at the BTDM interface will not overrun or underrun relative to any network channel (overrun relative to incoming data at the network interface, underrun relative to outgoing data) regardless of the rates of drift between local and remote channel clocks at the network interface. Stated another way, the rates of slot and frame recurrence at the BTDM are so paced relative to the rates of slot and frame recurrence at the network interface that all bits received in any channel at the network interface during one frame period will invariably fit in the allowed buffer space and be transferred across the BTDM interface during that period, and all bits sent out at the network interface during any period will be replaced so as to keep the corresponding buffer full during the same period.

The foregoing outpacing effect at the BTDM is presently called "positive slip" operation to distinguish it from systems in which correction for drift in any channel is accomplished with error by dropping a slot of data transfer time in order to resynchronize the drifting clocks. Data transfer element 41 is responsible for controlling transfers of data at the BTDM at the pace just discussed. Element 41 provides data transfer control signals, relative to interfacing elements RL1 and TL1 in device 3, defining instants during any active slot at which the latter elements are to respectively receive and transmit signals representing data bits. Data bits to be received are also presented by element 41.

Relative to RL1, element 41 provides control signals BTDM_RDATA_VALID together with data bit signals BTDM_RDATA, and RL1 is required to latch each data bit within 50 ns (nanoseconds) of the assertion of the respective RDATA_VALID indication. Relative to TL1, element 41 provides bit request signals BTDM_TDATA_REQ, and TL1 must present a data bit BTDM_TDATA to be latched by element 41 within 50 ns of the activation of each request signal.

The number of bits transferred by element 41, in either direction during any active BTDM slot, is variable from 0 to m, where the maximum number m in the embodiment to be described is 8, and the numbers of bits transferred in opposite directions during any slot are unrelated. In general, the number of bits which could be sent or received by element 41 in a slot is variable over a range determined by operating characteristics of the network and device 3.

The bit transfers directed by element 41 during a slot are conducted only during a time window in a short duration portion of the slot. Element 41 uses signals received from timing control element 42 to determine the boundaries of such windows.

Buffer manager element 40 buffers data in transit between element 41 and the network interface relative to each channel served by device 3. A critical feature of element 40 is its ability to determine the extent of fullness of its channel buffers and pace its BTDM slot operations in accordance with such determinations Since the BTDM is always running faster than the network relative to any channel, essentially providing an oversampling of data relative to the network, element 40 will neither be able to overrun its receive buffer relative to any network channel nor underfill its transmit buffer relative to such channel when the L1 circuits, device 3 and external system 5 are operating normally. It is this oversampling which produces the effect presently called "positive slip" in which the rate of data transfer at the BTDM relative to a channel may slip relative to the corresponding channel slot at the network interface (e.g. different numbers of bits sent or received at each) but always in a way such that data integrity is maintained.

Element 40 determines how many bits it must transfer at the BTDM to service its buffers and maintain its "lead", and requests that number relative to device 3 during the respective slot. That number is always less than or equal to the maximum supported by device 3 (in the present primary rate ISDN environment, the number is 8).

It is again noted that although each frame of slots at the BTDM presently recurs at a fixed rate and includes a fixed number of slots, the transfer of variable numbers of bits by data transfer element 41 and the provision of BOS and LSOF slot indicating pulses by timing control element 42 provide a basis for dynamically adaptive timing at the BTDM. Thus, it would be simple to adapt element 42 to truncate any frame by advancing the timing of the LSOF pulse, so as to effectively reduce the number of slots appearing in that frame (whereby, for instance, end slots in certain frames could be presented at a low recurrence rate for low frequency signalling functions). Also, it would be equally simple to adapt element 42 to truncate any slot by advancing the timing of the next BOS or LSOF pulse and lengthen other slots by delaying the next BOS or LSOF pulse (whereby, for instance, idle and active slots in a frame could be respectively shortened and lengthened so as to optimize the time available in device 3 for adapting to and dealing with the traffic in the active slots).

4. ARCHITECTURE OF IDLC DEVICE

FIG. 3, a block diagram of the logical organization of IDLC device 3, illustrates positioning of that device between IOP bus 4 and BTDM 1. Although operations of the device other than at the BTDM interface are not relevant to an understanding of that interface, the device's architecture and general operating characteristics are discussed here for environmental completeness. It should be understood that a complete description of the device is given in the cross-referenced application referring to "autonomous elements" in its title, and to the extent that such may have any ancillary relevance to the present application that description is incorporated herein by this reference.

The IDLC comprises synchronous and asynchronous sections, 50 and 51 respectively. This sectioning is of particular interest presently, in that it allows a portion of the device, the synchronous section, to operate in synchronism with the BTDM, while the rest of the device operates asynchronously (i.e. with reduced time dependency) relative to external systems and memories to which the device connects via bus 4. Also shown are principal logical partitions in each IDLC section, each partition containing one or more elements operating "autonomously" as described in the cross-referenced application referring to "autonomous elements" in its title.

Section 50 operates in synchronism with BTDM time slots assigned to active data communication channels to perform operations relative to data being transferred at the BTDM relative to those channels. Operations in section 51 relative to any channel are performed in asynchronous relation to respective time slots. RAM (random access memory) units 52 (hereafter also called FIFO RAM or FIFOR) and 53 (hereafter also called time swap RAM or TSR) are accessible to partitions in both sections, whereas RAM unit 54 (hereafter called DMA control RAM or DMAR) is accessible only to the asynchronous section. Each of the RAM's 52-54 is configured to dedicate a block of storage space relative to each basic time slot at the BTDM, and the space assigned to any slot is addressed in part by means of a time slot indication number TSI discussed below.

The synchronous section contains logic partitions 60-64, and the asynchronous section contains partitions 65-67. Partitions 60-62, form multitasking receive and transmit processing pipelines between the BTDM and FIFOR. These pipelines present 3 discrete stages of processing, in each direction of data movement, and operate to perform operations relative to any channel in synchronism with the BTDM slot assigned to that channel.

As shown in FIG. 3a, partitions 60-62 actually comprise six discrete logical partitions, three forming the receive pipeline (partitions 60L, 60V and 62R), and the other three forming the transmit pipeline (partitions 62T, 61V and 61L). These account for the three stages of processing in each direction, as noted above.

Partition 60L (the "receive layer 1" or RL1 partition) receives data bit-serially from the BTDM, in response to RDATA_VALID prompts from the BTDM, processes the data (including stripping protocol-specific bits and characters), and transfers remaining bytes in bit-parallel units to partition 60V (the "receive validation" or RV layer). RV performs protocol-specific checking of the data (e.g. CRC checking) and passes it in bit-parallel byte units to partition 62R (the "receive FIFOR manager" or RFM portion) which directs storage of the data in FIFOR array 52.

In the opposite direction, partition 62T (the "transmit FIFOR manager") fetches bytes of data from array 52 to partition 61V (the "transmit validation" or TV partition). TV appends calculates and appends check characters, and passes the data and check characters to partition 61T (the "transmit layer 1" or TL1 partition). TL1 performs additional processing, including insertion of protocol-specific bits and characters, and forwards the resulting data to the BTDM in response to request signals TDATA_REQ.

The foregoing operations are conducted relative to each active channel in synchronism with respectively assigned BTDM slot appearances.

In the receive pipeline, data received from the L1 circuits by RL1 relative to an active channel is manipulated in two stages of processing by RL1 and RV, during recurrences of the respective channel slot, and passed in bit-parallel byte serial form to RFM. RFM operates during recurrences of the respective slot to transfer the received bytes to a respective 4 byte wide receive data storage queue in FIFOR, in the space dedicated to the respective channel. Between recurrences of the respective slot, processing states of RL1, RV and RFM relative to the respective channel are saved in TSR.

To locate the appropriate byte position within the respective data storage queue, RFM extracts a byte address pointer from another part of the space dedicated to the respective channel, uses that information to write the data byte into the queue, modifies the pointer to point to a next byte position and then rewrites the updated pointer into FIFOR.

In the transmit pipeline, source data for transmission to an active network channel is fetched one byte at a time, from a 4 byte wide transmit data storage queue in FIFOR by TFM, and passed TV. TV calculates check characters if appropriate (in protocol channel), and passes the bytes to TL1, appending calculated check characters when required (after last data byte of protocol specific frame). TL1 processes the data to insert protocol-specific bits and characters where required, and transfers resulting data bit-serially to the BTDM in response to circuits in response to requests TDATA_REQ from the latter. All of these operations relative to any one channel are performed during recurrences of the respectively assigned BTDM slot. Between recurrences processing states of TFM, TV and TL1 are saved in TSR.

To locate the appropriate byte position of transmit data bytes fetched from FIFOR, TFM extracts a byte address pointer from another part of the space dedicated to the respective channel, uses that information to fetch a data byte into the queue, modifies the pointer to point to a next byte position and then rewrites the updated pointer into FIFOR.

Operations of the receive and transmit pipelines relative to all active channels are controlled by state swapping operations directed by resource management (RSM) partition 63. In such operations, RSM interacts with TSR 53, during and prior to each time slot associated with an active channel, to cause processing state information to be transferred from the TSR space dedicated to that slot to registers in each partition in each pipeline, and later to cause state information to be transferred from the partition registers back to the respective space in TSR.

State information fetched from TSR to the pipeline partitions represents processing states of those partitions when processing ended relative to the last previous recurrence of the respective slot. State information written from the partitions to TSR represents the processing states of those partitions at the conclusion of processing relative to the latest recurrence of the respective slot.

Such state information includes any communication data which the partitions may have incompletely handled during the latest recurrence of the respective slot; excluding transmit data being transferred by TL1 at BTDM, and certain other transfers, which are tightly synchronized to be completed within 50 ns of associated requests. Thus, if the number of receive data bits received by RL1 during a slot is less than a byte, those bits would be saved to TSR as part of the state of RL1 relative to the respective channel. Similarly, if TL1 has received a byte of transmit data from TV during a slot, and transferred only a part of it at the BTDM during that slot, the remaining bits would be stored as part of the processing state of TL1.

RL1 is responsible for bit-serial reception of data (and/or digitized voice) signals from the BTDM, in slots assigned to active channels, in response to RDATA_VALID prompts from the L1 circuits. RL1 accumulates such data into bytes which it transfers to RV. RL1 is also responsible for handling of such data in accordance with respective channel protocol requirements, which may require it to detect and discard protocol-specific bits and characters within the received data. RV passes received bytes to RFM, and is responsible for selectively performing protocol-specific operations such as CRC checking. Data in voice channels is passed in the "clear", without any selective handling or discarding.

The number of processing operations performed in these pipelines is quite substantial. Relative to data channels operating under a protocol (SDLC, HDLC, LAP-B, LAP-D, etc.), RL1 acts to detect and strip (remove) protocol-specific information (e.g. HDLC transparency bits and frame delimiting characters), to pass information to RV indicating protocol-specific frame events, to recognize destination addresses, to discard messages not directed to the local node, and to detect channelized error events at its stage (e.g. overruns). RV acts to perform error detection checks on received data (e.g. CRC checks), to detect channelized reception events (errors in checked message data) and to provide information to RFM relative to such events. RFM is also responsible for detecting channelized error events (e.g. parity error in readout from FIFOR) and storing associated status information in TSR.

In addition to passing source transmit data between TFM and TL1, TV is responsible for calculating protocol-specific check characters and inserting such at appropriate positions in each channel data stream. TL1 is responsible for detecting data positions requiring insertion of protocol-specific bits (e.g. HDLC transparency bits) and inserting same, for detecting data positions requiring special character insertion and inserting same (e.g. HDLC frame-delimiting characters), and for passing resulting data bit serially to the BTDM. TFM is also responsible for detecting channelized events (e.g. parity errors in data fetched from FIFOR), and storing status information relative to such in TSR.

RFM and TFM are responsible for transferring channelized data byte sequentially between slot-dedicated 4-byte wide data storage queues in FIFOR and respective pipeline partitions RV and TV. These operations are carried out in synchronism with respective BTDM slots. RFM and TFM are also responsible for indicating occurrences of channelized error events to INT partition 64.

In addition, RFM and TFM are responsible for monitoring states of occupancy in FIFOR of respective data storage queues, and for evoking action in the asynchronous section to cause further transfer of data between the respective queue and an external memory via bus 4. Such further transfer action is requested by RFM as a receive data storage queue becomes full and by TFM as a transmit data storage queue becomes empty. The action per se is carried out asynchronously by DMA control partition 65 (hereafter also called DMAC partition) and master I/O partition 66 (hereafter also called MIO partition). MIO arbitrates for control of bus 4 and upon obtaining such operates in response to signals supplied by DMAC to access external memory in a direct memory access (DMA) mode and write data thereto fetched by DMAC from a respective data storage queue in FIFOR.

Requests from partition 62 to initiate such transfers are actually applied synchronously to a DMA Request Queue (DMARQ) partition not shown in FIG. 3, latched by the latter in bit registers dedicated to respective channels and presented through such bit registers to partition 65 for asynchronous and selectively prioritized handling in a manner fully described in the cross-referenced patent applications (which is not relevant to the present discussion).

In operations of device 3 relative to receive pipeline RL1, RV, RFM, assuming that bus 4 and external memory have been selected to operate at suitable parallel transfer rates, the data buffer capacity for each channel, within the pipeline (3 bytes) and the FIFOR queue (4 bytes), considered together with the worst case rate of operation relative to external memory via bus 4 (taking into account worst case bus contention and other interferences), should be suitable for ensuring that the respective channel will not overflow (due to the entire pipeline being backed up and unable to accept another bit of receive data when the next RDATA_VALID prompt occurs at the BTDM).

Similarly, in operations relative to the transmit pipeline, assuming proper selection of bus and external memory design and loading characteristics, and taking into account worst case bus contention/interference), the rate of data throughput in any channel should be adequate to ensure that the respective channel will not experience underflow (absence of data in TL1 when a TDATA request is presented at the BTDM relative to the respective channel).

Interrupt partition 64 (INT) is responsible for collecting status information which must be reported to the external/host processing system via bus 4, and for generating interruption request signals to be presented relative to collected status information. Such reportable information includes hardware error conditions detected in IDLC and L1 circuits, channel errors detected in the processing pipelines 60–62, and channel events detected in the pipelines relative to channels operating under HDLC protocols (e.g. end of protocol frame, or end of data chain as explained below).

Relative to each separately reportable condition INT acts synchronously (in synchronism with respective BTDM slots) to present corresponding request and vector functions to slave I/O partition 67 (SIO), which the latter stores and presents asynchronously to the external system via bus 4. The request associates to the event and the vector indicates the event cause on a generalized level; distinguishing between hardware errors and channel related ("channelized") events (including channel parity errors and channel protocol framing events).

Status information more fully detailing the cause of each event is stored for asynchronous retrieval by the external system. Status information detailing cause of hardware error events is stored in predetermined hardware registers (in the IDLC if the associated event occurred in it and in the L1 circuits if the error occurred there). Status information more fully detailing channel error and protocol frame transition events is stored in TSR, in a dedicated part of the space dedicated to the slot assigned to the respective channel.

After receiving and monitoring each request and associated vector, the external system acts through SIO (asynchronous to the event and to its examination of the request/vector) to access the appropriate register or TSR space and retrieve the associated detailed status information. As described in the cross-referenced patent applications which describe the IDLC more fully, the space in TSR allocated for storage of channel event status allows for queueing of information relative to multiple protocol frame transition events occurring at different times within one channel, and external retrieval of such in a single operation relative to bus 4.

In regard to multiple channelized event queues in TSR, although partition 62 is responsible for writing status information into these queues and the external processing system is responsible for retrieving such, INT is responsible for tracking the state of fullness of such queues and providing suitable indications to the external system when any queue approaches overflow.

SIO provides paths to IDLC and L1 registers and IDLC local RAM TSR which facilitate efficient retrieval of interrupt event status by external processing systems; i.e. with reduced interference to communication data processing and transfer operations concurrently being handled in the IDLC. Furthermore, SIO provides connection paths allowing an external processing system to write information into each of the IDLC local RAM's 52-54, and into certain key configuration control registers in the IDLC, whereby the IDLC may be dynamically initialized relative to any new channel or extended channel assignment while presenting minimal interference to data handling operations within the IDLC.

4.1 BTDM/IDLC SLOT TIMING

Figure 4:
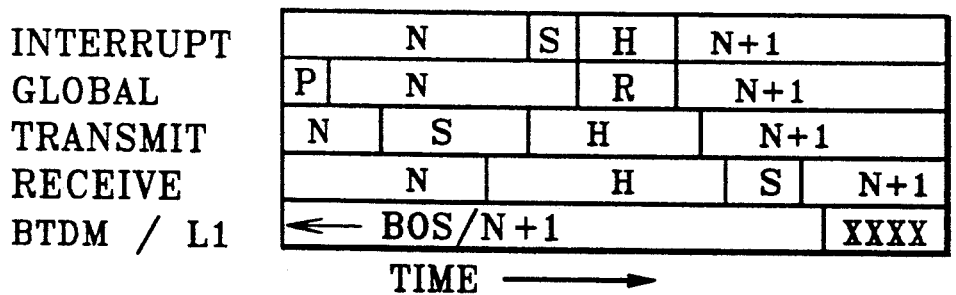
FIG. 4 is a time chart of functions performed within the synchronous section of the subject device, under direction of its resource manager partition RSM, in response to signals transferred from L1 circuits at the BTDM interface.

FIG. 4 illustrates time relationships between BTDM slots and certain IDLC activities which must be coordinated with the slots. In the present embodiment, the BTDM time division frame contains 32 cyclically recurrent slots numbered from 0 to 31, slot 0 being the first slot of each frame of slot recurrence and slot 31 the last slot of the frame (later abbreviated LSOF). The last line of FIG. 4 shows a BTDM slot arbitrarily identified as slot number N+1.

Proceeding upward from the last line in FIG. 4, the next two lines respectively illustrate activity states in the receive pipeline (RL1, RV and RFM in FIG. 3a) and transmit pipeline (TFM, TV, TL1 in FIG. 3a). The next line indicates activity states of RSM relative to the fetching of global variables defining successive slot configurations, and the top line indicates activity states in the interrupt partition INT.

Considering the activity states in the receive pipeline, FIG. 4 shows that while slot N+1 is occurring at the BTDM, this pipeline is completing its processing activities relative to the channel associated with slot N, then enters a halted mode H (enabling the state machines in the pipeline partitions to sequence to stable states before their processing states relative to channel N are saved), then undergoes state swapping (state relative to channel N saved to TSR 53, if that channel is active, and state relative to slot N+1 (re)loaded from TSR if the slot is assigned to a currently active channel). Finally, the pipeline begins its assigned processing activities relative to the channel of slot N+1 (which should be understood to overlap the appearance of slot N+2 at the BTDM).

In the transmit pipeline, as BTDM slot N+1 occurs, the pipeline winds up its processing relative to slot N, then swaps states relative to slot N+1, then halts (to wait for a start signal from RSM) and then begins processing relative to the channel of slot N+1 (again understood to overlap appearance of slot N+2 at the BTDM, etc.).

The global variables which indicate the channel type, activity state etc. are handled in two stages; first a portion of a configuration control register variable CCR is prefetched (P) to enable RSM to determine if a currently active channel is assigned to slot N+1 and if so its type (basic or HyperChannel), then RSM activities relative to slot N, which precede the prefetch, are resumed, then the full global variable CCR for slot N+1 is fetched if that slot is assigned to an active channel, and RSM begins its processing activities relative to that slot. The global variable for slot N is not saved to TSR because it is never changed by RSM.

Finally, the synchronous part of the interrupt handling process includes a phase of continued processing relative to the channel of slot N, followed by a state swap relative to slot N+1, followed by a halted interval preceding the start of processing for slot N+1 (which obviously overlaps appearance of slot N+2 at the BTDM).

Operations—General

Referring to FIGS. 3 and 4, at power-up signals presented by the host/IOP system via bus 4 reset and initialize the IDLC and L1 circuits. The IDLC partitions are cleared of non-relevant status, set to idle states and conditioned by state processing inputs to local RAM's and registers to begin operating relative to the BTDM and accept further host/IOP inputs for activating individual channels and setting up task processing configurations relative to such. Initializing information for the L1 circuits is transferred via line 69 to not-shown registers in the L1 section. Initializing information for asynchronous section 51 of the IDLC is passed via bus 35, MIO 66 and DMA partition 65 to RAM's 52 and 54. Initializing information for synchronous section 50 is passed to RAM 53 via bus 35 and SIO 67.

After initialization, the L1 circuits obtain synchronization to the network as explained previously, the IDLC is set to an active mode, and processing begins for activating network channel functions. Channels are activated individually. In addition to critical parameters loaded into the IDLC during initialization, before a channel can be activated control parameters must be entered into RAM's 52-54 and certain registers discussed later for conditioning all processing partitions to perform functions required for the respective channel types.

When a channel is activated, beginning of slot signals indicating recurrences of the respective time slot are received by IDLC partition RSM from BTDM 1. The signal indicating the last slot of each frame of BTDM slot recurrence is indicated to RSM separately so that RSM may also maintain an internal count of slots within each frame. This slot count enables RSM to determine which channel is to be processed during the current slot, and determines the addressing of TSR by RSM relative to that channel. During each slot assigned to an active channel, RSM loads processing state parameters from TSR to each partition in the synchronous pipelines, and issues a start signal which conditions the pipelines to begin their processing task execution relative to the channel currently served. The first channels activated sustain signalling between the local system and remote systems for establishing full duplex links in other channels which then are activated. During processing relative to any active channel slot, a variable number of data bits is transferred between the device 3 and L1 circuits at the BTDM interface (0 to 8 bits in each direction), and if a reportable channel event occurs during that slot (e.g. transfer of the last byte of an HDLC message frame), the event is detected within the pipelines, a corresponding indication is given to the INT partition, and status information relative to the event is collected in RAM 53 and made available to the host system via SIO 67 as explained above.

Referring to FIG. 4, state swapping processes conducted by RSM, relative to communication channels associated with time slots at the BTDM interface (in this figure, consecutive slots N and N+1), involve transfers of four types of variables; transmit-specific, receive-specific, interrupt-specific and global. State swaps (saving of element processing states relative to a channel associated with a time slot now ending, and reloading of previously saved states relative to a channel whose time slot is now beginning) are conducted only relative to active channels. Global variables are common to transmit, receive and interrupt processing. A small portion of one global variable, indicating the channel type, is prefetched relative to both active and inactive channels in order to distinguish such.

Transmit-specific variables are transferred relative to elements in transmit pipeline partitions 61 and 62. Receive-specific variables are transferred relative to elements in receive pipeline partitions 60 and 62. As indicated later, and in the cross-referenced patent applications more fully describing the IDLC, partition 62 actually comprises separate sub-partitions 62R (also called RFM) and 62T (also called TFM) for respectively managing usage of FIFOR relative to receive and transmit data. Furthermore, receive and transmit partitions 60 and 61 actually comprise sub-partitions discussed below which form pairs of stages in respective pipelines. Interrupt-specific variables are transferred relative to INT partition 64. Global variables are transferred relative to resource manager (RSM) partition 63.

Global variables, defining channel-specific configuration and protocol associations, are transferred relative to configuration registers CCR (Configuration Control Register) and HPCR in RSM 63 in synchronism with channel processing (see intermediate and detailed descriptions of RSM which follow). While registered in RSM, these variables are effectively shared by all partitions.

Other transient variables relating to handling of interruption event status are held in registers CEISR (Channel Events Interrupt Status Register) in INT, EOPISR (End Of Process Interrupt Status Register) in INT, IHEISR (IDLC Hardware Error Interrupt Event Status Register) in INT, and VHR (Vector Holding Register) in SIO. Contents of CEISR and EOPISR are swapped relative to TSR in synchronism with channel time slot appearances. The contents of IHEISR and VHR are held static until retrieved by the IOP.

Other global variables defining HyperChannel (or extended channel) associations are held in register HCR (HyperChannel Configuration Register) in SIO on a static basis (not synchronously saved and reloaded; see later description of HyperChannels). Other variables defining device configuration parameters not specific to any channel are held static in register ICR (IDLC Configuration Register) in SIO. Transfers of receive, transmit and interrupt variables are true saving and reloading "swaps", but transfers of channel-specific global variables relative to registers CCR and HPCR in RSM 63 are one way only (although these variables may differ from channel to channel, they do not change as a function of IDLC processing relative to any channel and therefore need not be saved as channel slots conclude).

The state swap actions (S) are staggered in phase within each time slot period; global and interrupt first, transmit-specific next and receive-specific last. While the global variables are loading, the partitions in both pipelines are halted (H). It is understood of course that these actions are omitted during time slots associated with inactive channels.

Upon receiving BOS/N+1 via the BTDM, indicating the start of slot N+1, RSM signals the synchronous partitions in the transmit pipeline to prepare for transmit-specific swapping. If channels N and N+1 are both active, elements in the transmit pipeline whose state machines are in stable states from which they can resume on the next appearance of channel N time slot immediately signal "DONE" conditions to RSM and have their transmit process states swapped relative to respective state storage areas in TS RAM (if N is inactive no state information will be transferred to TS RAM, and if N+1 is inactive no state information will be loaded from TS RAM). The state information saved relative to channel N (assuming it is active) is sufficient to enable respective elements to resume processing for that channel without loss of continuity when the respective time slot recurs. Similar actions occur at the phase of receive-specific swapping.

Elements not in stable states, when processing relative to an active channel N, and signalled by RSM to prepare for state swapping, sequence to their next stable states before asserting DONE status and undergoing state swaps. As will be shown later, the staggering of the swapping actions relative to transmit and receive processes, and the subdivision of same into directional specific and global stages, coordinated with specific present phasing of signal transfers to and from BTDM 1, provide highly efficient usage of RAM 53 and the transmit and receive partitions (without which larger RAM and more circuitry in the pipeline partitions would be needed).

6. Details of BTDM Control Circuits

6.1 BTDM Data Transfer Unit

Referring to FIG. 5, the BTDM data transfer unit connects to the BTDM interface for transferring data bits serially to and from the latter, and for presenting respective control signals, BTDM_RDATA_VALID and BTDM_TDATA_REQ, which prompt partitions RL1 and TL1 in the IDLC to respectively receive and transmit data bits.

Data which is to be transferred to the BTDM interface in the current BTDM time slot (assuming that slot is assigned to an active channel) is received at input "RCV_DATA", from the buffer manager unit (FIG. 6) discussed below, and latched into register 70. Such data consists of a variable number of bits (0 to 8 in the present embodiment) received and latched in parallel, which is shifted out bit serially to the BTDM along with respective prompts BTDM_RDATA_VALID. The transfer at the BTDM interface is carried out during a short duration window within the respective BTDM slot.

During any time slot associated with an active channel, a variable number of bits of transmit data is received bit serially from the BTDM interface at BTDM_TDATA and shifted into register 71. Each bit at BTDM_TDATA is presented by IDLC partition TL1 in response to a corresponding request presented by this unit at BTDM_TDATA_REQ. Such transfers are also made during a short-duration window of time in the slot. The bits latched in register 71 are presented to the data buffer unit at output "XMIT_REG" and transferred to that unit in parallel at the end of the slot.

The number of transmit data bits requested at BTDM_TDATA_REQ and the number of receive data bits presented at BTDM_RDATA during a slot is determined by the buffer manager unit. Operations of the BTDM data transfer unit are controlled by state machine logic 72. During each active BTDM slot, logic 72 receives indications from the buffer manager unit at RCV_BITS_REQUESTED and XMT_BITS_REQUESTED, respectively designating the number of receive data bits to be forwarded to (RL1 via) the BTDM and the number of transmit data bits to be requested (from TL1) at the BTDM. During the transfers, counts in receive and transmit bit counters 73 and 74 are incremented from initial 0 values and compared to the respective numbers requested. Transfers continue until the counts equal respective numbers requested.

In any slot in which data is to be transferred relative to the BTDM, logic 72 also receives a controlling indication DATA_TRANSFER_ENABLE from the timing control unit which defines the time window for the transfer and enables the transfer to be executed. During any slot in which data is being transferred, logic 72 also receives controlling indication XFER_REQ from the buffer manager to condition the logic to latch the number values presented at RCV/XMT_BITS_REQUESTED. Finally, at beginnings of slots, logic 72 receives a RESET signal from the timing control unit.

6.1.1 Data Transfer State Machine States

Composition of this logic is detailed by the following description of its states.
RESET On reset, clear counters 73 and 74, and go to state 0
STATE 0 (WAIT FOR BFR MGR XFER_REQ, AND GO TO STATE 1)
If XFER_REQ asserted, load register 70 and go to state 1
Else, remain in state 0
STATE 1 (WAIT FOR DATA TRANSFER ENABLE)
If DATA TRANSFER ENABLE, go to state 2
Else, remain in state 1
STATE 2 (FIRST CYCLE OF DATA TRANSFER)
Compare receive and transmit counts to respective numbers of receive bit and transmit bit transfers requested. If receive count less than receive bits requested, there is more receive data to be sent to BTDM. If transmit count less than transmit bits requested, more transmit data is to be received.

If there is more receive data to transfer, shift out next bit from register 70 (at BTDM_RDATA) with RDATA_VALID prompt. If there is more transmit data to be received, assert TDATA_REQ. Proceed to state 3.
STATE 3 (SECOND CYCLE OF DATA TRANSFER)
If TDATA_REQ active, shift transmit data (BTDM_TDATA) from BTDM to register 71, and increment XMT_COUNT. If sending receive data (BTDM_RDATA_VALID active), increment RCV_COUNT. If neither condition active, transfer is over; proceed to state 4. If either condition active return to state 2 to continue transfer.
STATE 4 (ACKNOWLEDGE TRANSFERS TO BUFFER MANAGER UNIT)
If XFER_REQ or DATA_TRANSFER_ENABLE active, assert XFER_ACK to buffer manager unit, and return to state 3 (to wait for request to clear and return to this state).
Else, return to state 0.

6.2 BTDM Buffer Manager Unit

The BTDM buffer manager unit controls the flow of data between the BTDM data transfer unit and the network interface. Only part of the associated L1 data flow circuitry is shown here; the part directly interfacing with the data transfer unit. The parts interfacing directly to the network are not shown here, being irrelevant to the present discussion and differing as a function of interface media and protocols. Also, the logic for determining fullness of channel buffers in this unit is not shown, inasmuch as the action taken upon such is dependent upon network interface characteristics.

During each BTDM slot assigned to an active channel, the buffer manager requests a variable number of bit transfers in each direction relative to the data transfer unit (0 to 8 presently). The number of receive bit transfers requested is matched to the state of fullness of a respective channel receive buffer, and the number of transmit bit transfers requested is matched to the state of emptiness of a respective channel transmit buffer; so that relative to any active full duplex channel, this unit is always seeking to empty a respective receive data buffer and fill a respective transmit data buffer. Since the BTDM timing controls are always running slightly faster than the network clocks, the amount of data transferred at the BTDM in each slot should always be at least equal to the theoretical maximum of data which could be transferred at the network interface regardless of drift between local and remote network clocks, thereby ensuring error free network operation under normal conditions.

Figure 6:
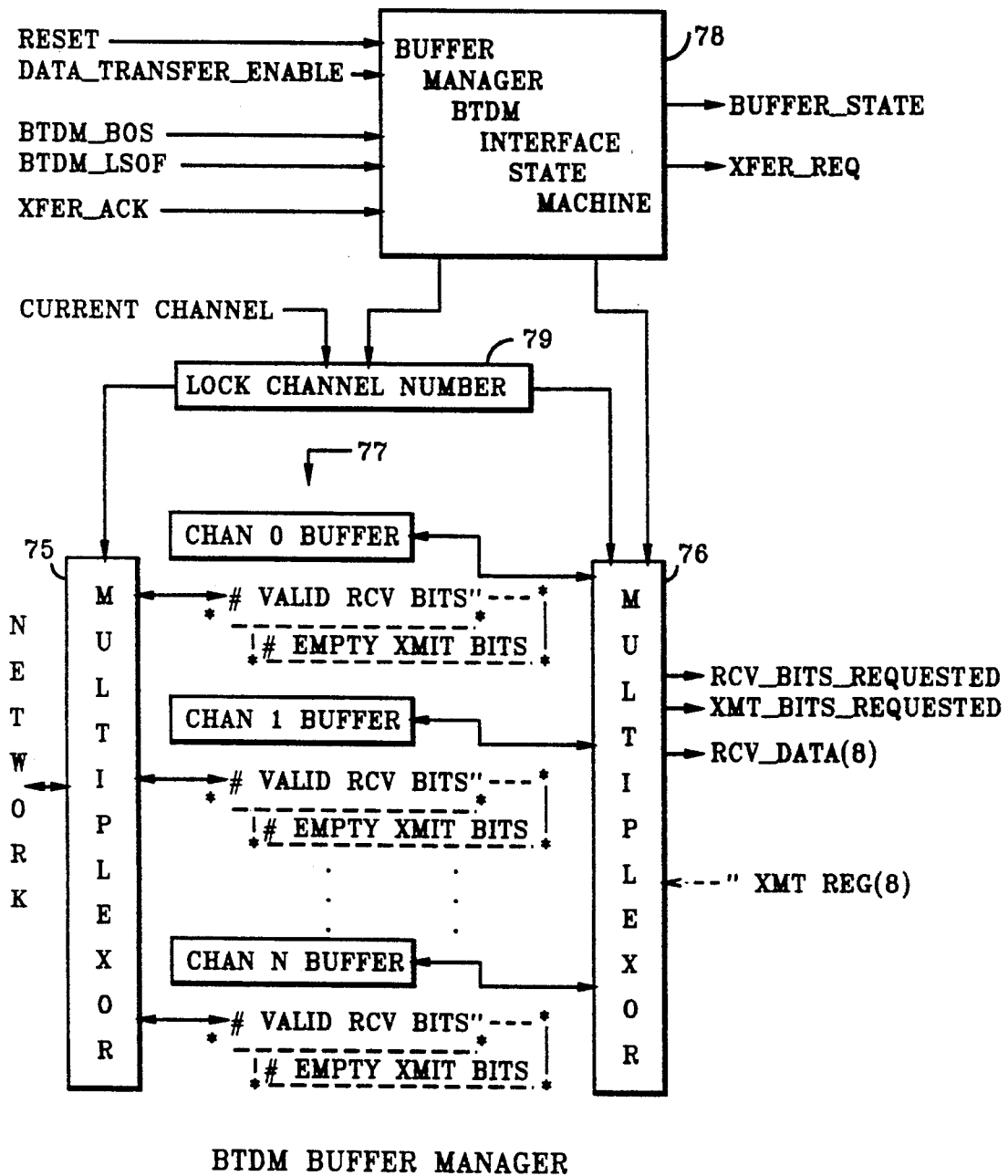

Referring to FIG. 6, the buffer Manager unit comprises multiplexors 75 and 76, respectively connecting to the network interface and the data transfer unit. The multiplexors interface to N+1 channel buffers indicated at 77, which associate to individual BTDM slots (N+1 equals 32 presently). State machine logic 78 controls operations of the unit and multiplexors. A lock channel number register 79 is used to indicate the number of the current BTDM slot.

Shown schematically below each channel buffer is a respective counter/register for indicating the number of valid receive bits in the receive data part of the buffer and the number of empty bit positions in the transmit data part of the same buffer (i.e. the states of fullness and emptiness of these parts, as needed for determining transfer handling relative to respective parts).

6.2.1 Buffer Manager State Machine

This logic has three time indicative inputs from the timing control unit (FIG. 7): DATA_TRANSFER_ENABLE, BTDM_BOS, BTDM_LSOF. These respectively indicate the time window during each slot in which BTDM data transfers are permitted, the beginning of each BTDM slot and the last slot in each frame of BTDM slot recurrence. Other inputs include external RESET input from the processing system bus 4 (FIG. 3), and transfer acknowledge indicator XFER_ACK from the data transfer unit.

Outputs from logic 79 include the transfer request indicator XFER_REQ, which is presented to the data transfer unit during BTDM slots in which data transfers are to be made, and state indicator BUFFER_STATE, which is used internally to indicate the buffer state for the channel associated with the current slot.

Composition of this logic is detailed by the following description of its states.

RESET

On RESET, clear all counts and multiplexor BITS_REQUESTED functions; move to state 0.

STATE 0 (WAIT FOR NEW BTDM SLOT INDICATION)

If BTDM_BOS or BTDM_LSOF active, set lock channel number to current BTDM slot/channel number, and advance to state 1. Else, set lock channel number to null value, and remain in state 0.

STATE 1 (DETERMINE NUMBERS OF BIT TRANSFERS TO REQUEST)

Set RCV_BITS REQUESTED to the number of valid receive bits currently contained in the receive buffer assigned to the current BTDM slot/channel. Set XMT_BITS_REQUESTED to the number of empty bits in the transmit buffer for the current slot. Present 8-bit RCV_DATA output to data transfer unit (bits in current receive buffer with 0's concatenated in empty positions to complete 8 bit field). Advance to state 2.

STATE 2 (WAIT)

This is a timing delay state to wait for the bits requested and RCV_DATA outputs to stabilize at valid levels. Assert XFER_REQ to data transfer unit, and proceed to state 3.

STATE 3 (WAIT FOR DATA TRANSFER ACKNOWLEDGEMENT)

Check to see if current channel number and lock channel number are equal (i.e. to see that BTDM is still on same slot), and if so wait for XFER_ACK activation. If not equal assert error indication relative to INT partition of IDLC device.

When XFER_ACK active, latch transmit data from the data transfer unit (XMIT_REG) into the transmit channel buffer pointed to by the lock channel number count. This data should consist of the number of bits requested with 0's concatenated, and is OR'd into the designated transmit buffer so that the bits requested are written into the empty bit spaces of that buffer and the concatenated 0's are OR'd into non-empty spaces.

Reset all empty bit indications relative to the respective channel transmit buffer, and all valid bit indications relative to the respective channel receive buffer. Also, reset the RCV_REG, and reset all bits requested numbers to 0. Also, deassert XFER_REQ.

Go to state 0.

6.3 Timing Control Unit

This unit defines the current BTDM channel/slot number and the portion of the slot interval during which transfers can be made. The unit is designed to provide a frequency of slot recurrence at the BTDM which is slightly higher than that at the network interface.

Figure 7:
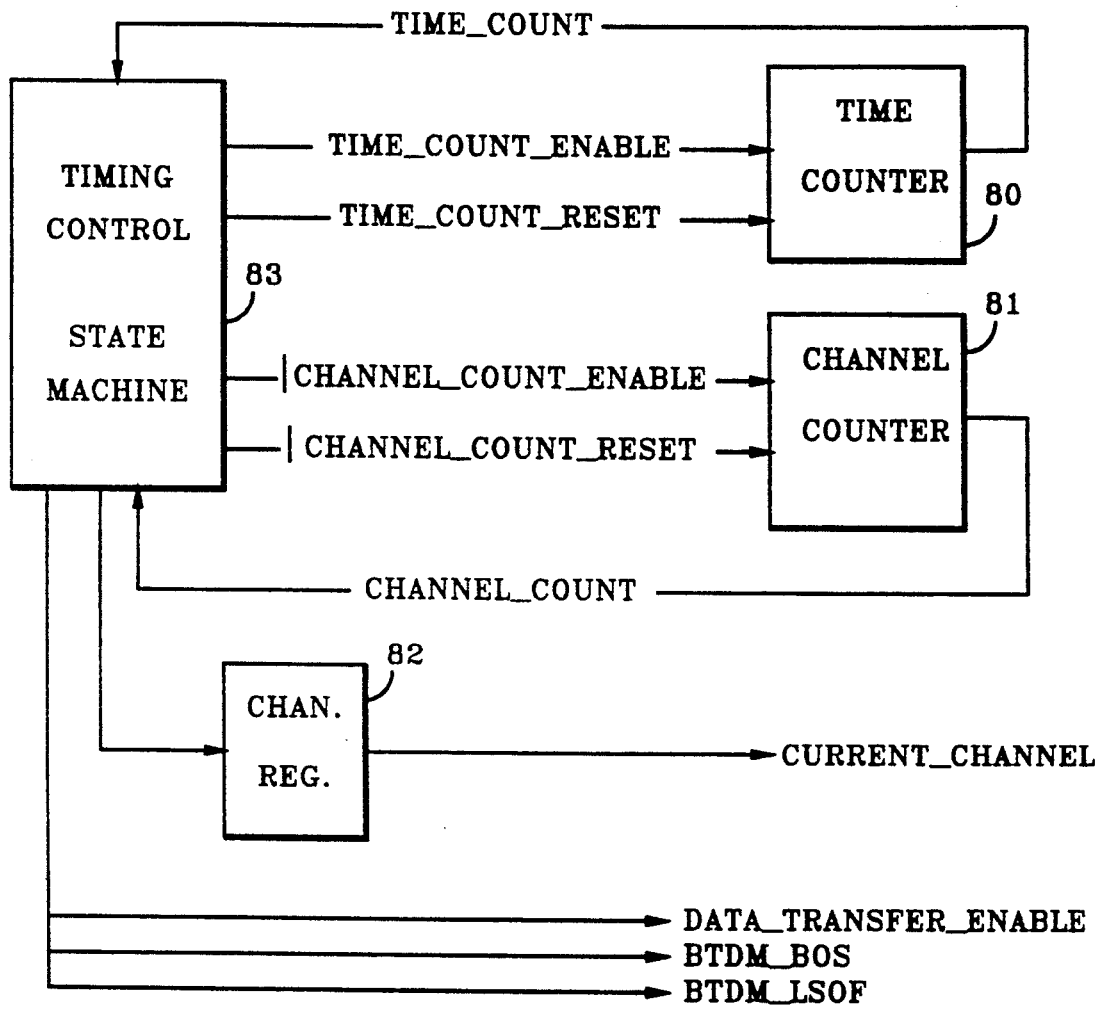

Referring to FIG. 7, the unit comprises time and channel counters 80 and 81, for respectively indicating bit and channel slot counts relative to the BTDM. The unit also contains a channel register 82, for indicating the current channel association of the current BTDM slot, and state logic 83 for controlling all operations of the unit. A not-shown oscillator, which provides the time reference for operations of this logic, is designed to set the slot recurrence rate at the desired frequency for positive slip operation.

6.3.1 Timing Control Unit State Logic

Composition of this logic is detailed by the following description of its states.

RESET

On external reset, reset all counters, deactivate TIME_COUNT_ENABLE, activate CHANNEL_COUNT_ENABLE, and advance to state 0.

STATE 0 (START CHANNEL TIME COUNT TIMER)

Activate TIME_COUNT_ENABLE, and advance to state 1.

STATE 1 (WAIT FOR TIME COUNT EQUAL BTDM SLOT PERIOD)

If time counter value equals BTDM slot period (3.8 microseconds, presently; which fixes the slot and slot frame recurrence rates at the frequencies presently needed for positive slip operation), pulse either BTDM_BOS or BTDM_LSOF; LSOF if beginning last slot of BTDM slot recurrence frame (channel count equals 31 presently), BOS otherwise. Also, increment channel counter (modulo 32 presently, so reset count to 0 at end of last slot of frame), save channel count value in current channel register (providing CURRENT_CHANNEL indication to the buffer manager unit, reset time counter, disable TIME_COUNT_ENABLE, and go to state 2.

If time count less than slot period, remain in state 1.

STATE 2 (WAIT FOR TIME COUNT EQUAL TO START OF XFER WINDOW)

If time count is at start of the BTDM transfer window (2.9 microseconds from BOS presently represents the beginning of a 50 nanosecond guard space before the actual transfer begins at 2.95 microseconds) advance to state 3. Otherwise remain in this state.

STATE 3 (DATA TRANSFER PHASE)

If time count less than end point of transfer window (3.75 microseconds presently, leaving a guard space of 50 nanoseconds between the end of transfer and the next BOS), assert data transfer enabling function, DATA_TRANSFER_ENABLE, to data transfer and buffer manager units, and remain in this state. When time count reaches window limit, deassert data transfer enabling function.

7. Interface Connections and Timings

Figure 8:
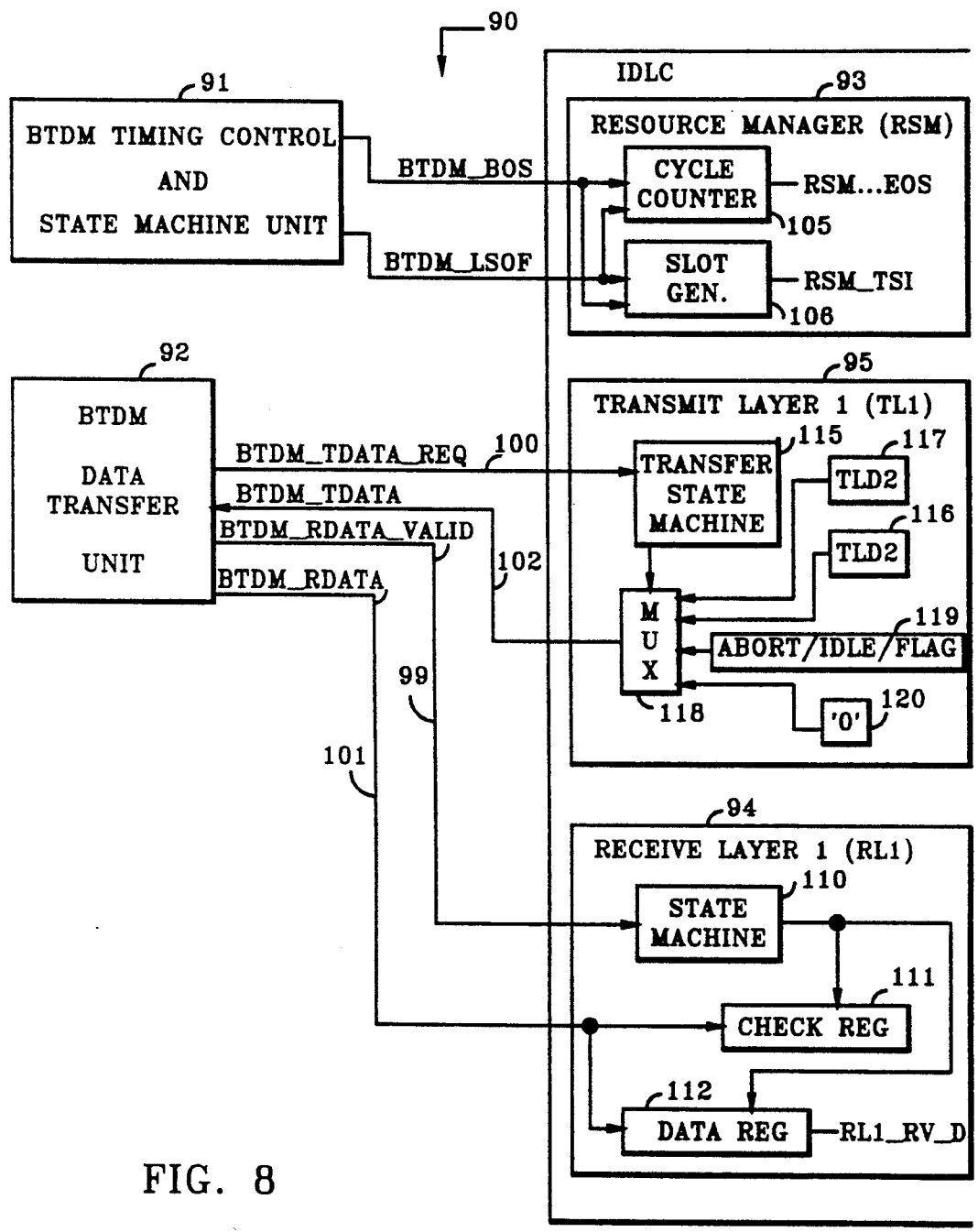
FIG. 8 illustrates the lines of the BTDM interface and their circuit terminations in the L1 circuits and IDLC device which connect through the interface.

FIG. 8 schematically indicates the circuits connecting to the BTDM interface at both the L1 and IDLC sides, and FIGS. 9-11 indicate data and control signal timings on the interface lines. It should be understood that although the IDLC is a highly sophisticated multitasking device, relative to the BTDM it is a rather simple slave circuit.

The RL1 and TL1 partitions (FIG. 3a) in the IDLC task pipelines, once conditioned by state loading and configuration control processes directed by RSM and given a start signal by RSM, operate as simple slaves of the L1 data transfer unit with respect to transfers of individual data bits during a slot. Also, RSM partition need only latch beginning of slot indications presented by the L1 timing control unit (BTDM_LSOF if last slot of frame, BTDM_BOS otherwise), and its other operations are thereafter performed without any effect or relevance to the BTDM.

Shown in FIG. 8 at 90 are the control and data lines of the subject interface. To their left, are the L1 timing control unit 91 and data transfer unit 92 described before, which control the interface and the passage of data thereover. To the right are the IDLC partitions RSM (Resource Manager) 93, RL1 (Receive Layer 1) 94, and TL1 (Transmit Layer 1) which connect to the lines 90.

Lines 90 consist of two slot defining lines 97 and 98, two bit transfer control lines 99 and 100, and two data bit transfer lines 101 and 102.

Lines 97 and 98 transfer BOS and LSOF pulses shown in FIG. 9 which indicate beginnings of BTDM slots. As explained earlier, these are generated by the BTDM timing control unit (91) and as shown in FIG. 8 they are applied to cycle counter circuit 105 and slot generator circuit 106 in RSM. BOS pulses on line 97 indicate beginnings of slots other than the last slot of the slot recurrence frame, beginnings of the latter slots being indicated by LSOF pulses on line 98. In the described 32 slot embodiment, the BOS pulses indicate beginnings of slots 0 to 30 and the LSOF pulses indicate beginnings of slots 31.

Cycle counter 105 is reset by each BOS and LSOF pulse and thereafter counts internal clock pulses of the RSM partition to produce a signal RSM_EOS which is distributed to the IDLC pipeline partitions (including RL1 and TL1) as an indication that the slot is ending. The latter partitions then prepare for state swapping operations described generally above and fully in the cross-referenced patent applications. Slot generator 106 is a slot counter which is reset by the first BOS pulse following each LSOF pulse. Its output RSM_TSI indicating, the current slot number, is applied to all synchronous IDLC partitions which reference local RAM memories of that device (TFM, RFM, which use the signal as a partial address pointer) and to a partition DMARQ (briefly mentioned earlier and fully described in the copending applications) which links the synchronous and asynchronous sections of the device for data transfer continuity.

Pulses RDATA_VALID on line 99, timed as shown in FIG. 9, serve as strobes for directing transfers of individual receive data bit signals BTDM RDATA presented on line 101 (also shown in FIG. 9. As shown in FIGS. 9 and 10, RDATA_VALID and RDATA pulses have 50 ns (nanosecond) durations, and a variable number of such (0 to 7 presently) are presented during an 800 ns window of time at the end of each 3.8 microsecond slot (see FIG. 10) assigned to an active channel. Accordingly, more than ⅞ths of each slot period is available to the RSM as "setup time" (see FIG. 10) for saving prior states, and reconfiguring and initializing process states in the synchronous IDLC section before data transfers and other pipeline task functions begin.

As explained earlier, the differently numbered slots are dynamically assignable to channels handling voice and data arranged according to various communication protocols (e.g. HDLC, Bisynch, etc.), such protocols require performance of different processing tasks in the IDLC pipeline stages, and therefore RSM and those stages must be individually configured by information stored in TSR (53, FIG. 3). Since the state saving and reconfiguring operations consume considerable time in each slot, the need for such setup time and the related benefit derived from compressing the data transfer into the 800 ns burst window should be appreciated.

The RDATA_VALID pulses are applied to the state logic 110 of RL1, which operates within the 50 ns constraint of each pulse to condition a check shift register 111 and a data shift register 112 for receiving the RDATA bit then appearing on line 101. Data bits are shifted into register 112 until logic 111 detects that a valid byte has been received, and then the byte is transferred to RV (FIG. 3a) for further handling. However, certain bits and certain bytes are not so handled.

In channels receiving HDLC data and the like, each bit shifted into check register 111 is evaluated to determine if is a transparency insert (stuff bit) placed to prevent interpretation of the data as a flag/control character. RL1 state logic 110 is responsible for detecting and removing from any received HDLC data stream transparency bits and flag characters. When logic 110 detects that the data bit last received is a transparency bit it inhibits shifting of register 112 and posts an indication that the bits therein do not represent a valid byte. This causes the transparency bit to be overwritten by the next valid data byte entered into register 112, and thereby effectively removed.

This overwriting happens even when a transparency bit arrives as the last bit in a receive data burst, since the posted indication that the register does not contain a full byte is preserved (so that the data is not transferred to RV) and saved with the data in register 112 as part of the RL1 processing state of RL1 relative to the respective slot. Accordingly, at the next cycle of RL1 processing relative to the same slot, this state will be restored and the transparency bit will be overwritten by the next received byte.

Similarly, if logic 110 detects that a protocol-specific flag (or other control) character is in register 111, it will suppress transfer of the associated byte from register 112 to RV, whereby the character will be overwritten by the next received data byte.

A reverse process occurs in TL1. TL1 contains state control logic 115, a pair of data registers 116 and 117, and a multiplexor 118. Logic 115 operates relative to an active transmit channel to track the vacancy status of the registers and fill them with bytes obtained from TV, alternating between registers in "ping pong" fashion. In response to each TDATA_REQ prompt appearing at line 100 (from 0 to 8 such pulses presented during any burst window), logic 115 conditions multiplexor 118 to transfer a bit of data from the registers 116 and 117 (which are selected alternately when both are full, so that first one is emptied and then the other) to the TDATA line 102.

In channels assigned to HDLC data, logic 115 is alerted by signals from TV when the last byte of a frame is transferred to one of the registers 116, 117, and after that last byte has been transferred to the BTDM, multiplexor 118 is conditioned to insert an end of frame flag character which it selects from a source 119 of flag and other control character symbols (e.g. abort and idle control characters). At other phases of the transfer process, and where required relative to protocol-specific data, abort or idle characters are inserted into the transmit data, and where appropriate null characters are selected from a respective source 20 and inserted.

FIG. 11 illustrates timing of internal L1 clocks C1 and B2 which respectively time TDATA REQ and RDATA_VALID pulses. C1 is a master clock and B2 is derived from C1. Each clock pulse has 20 ns duration, and each B2 pulse follows a corresponding C1 pulse after a guard space of 5 ns. Each data bit transfer period has 4 clock phases defined by the duration of a B2 pulse, the interval from the end of that B2 pulse to the rise of the following Cl pulse, the duration of that Cl pulse and the interval from its end to the start of the next B2 pulse.

Transfers of data are unacknowledged, and indicated in this figure by "****" for receive data, RDATA, and "####" for transmit data, TDATA.

We claim:

1. In a data processing system having multiple internal time division multiplex channels, for receiving data from multiple external sources in a data communication network, a burst time division multiplex (BTDM) interface for isolating said internal time division channels of said system from time-dependent aspects of such data transfers comprising:

circuit means coupled between external data transmission channels in said communication network and said internal time division channels of said system, said circuit means operating to transfer data signals from said external data transmission channels of said system to respectively assigned internal time division channels of said system, while isolating said internal time division channels and said system from timing differences between data signal clocking references in said internal channels and data signal clocking references in said external channels;

a plurality of data transfer and control lines connecting said circuit means with said internal time division channels of said system, said data transfer and control lines forming a discrete time division multiplex data transfer interface between said circuit means and said internal time division channels of said system; said control lines including at least one timing control line controlled by said circuit means for providing recurrent time reference signals to said internal channels; said time reference signals defining time division frames and basic time slots within each frame; each said internal channel having at least one basic time slot within each frame assigned thereto for defining periods in which received data can be handled within the respective internal channel; said control lines also including at least one data available control line for presenting signals indicating during any said basic time slot availability of data to be transferred to an internal channel to which the respective basic time slot is assigned; signals presented on said data available control line being useful for prompting the internal channel to which a currently defined basic time is assigned to receive a variable number of data bits during that time slot;

said circuit means comprising:

timing means connected to said at least one timing control line for generating said time reference signals defining said time division frames and plural basic time slots within each frame; said timing means operating at a predetermined cyclic rate related to the maximum rate at which data can be transmitted in said external channels;

buffer means connected to said external channels for receiving and temporarily storing data to be transferred to said said respectively assigned internal during periods of recurrence of said basic time slots assigned to said respectively assigned channels; and data transfer means connected to said data transfer lines, said data availability prompting control lines, said buffer means and said timing means for operating during each said basic time slot to cause all data received in said buffer means since the last previous recurrence of the respective basic time slot to be transferred bit-serially from said buffer means to the internal channel to which the respective basic time slot is assigned via said data transfer lines; whereby said buffer means is effectively emptied between successive said time division frames at a rate faster than the maximum rate at which data can be transmitted in any of said external channels.

2. A BTDM interface in accordance with claim 1 wherein:

said at least one timing control line, includes a first timing control line for transferring frame reference timing signals indicating successive said time division frames, and a second timing control line for transferring time slot reference signals indicating time division time slots in each of said frames; and said timing means includes means coupled to said first and second timing control lines for presenting time separated pulse signals thereon indicating to said internal channels transitions between consecutive frames and transitions between consecutive time slots within each frame; whereby the number of slots defined in any frame and their time durations are variably determinable by said timing means.

3. A BTDM interface in accordance with claim 1 wherein:

said buffer means includes means for storing n bits of data relative to each of said external channels, where n represents the maximum number of bits transmittable in any external channel between consecutive said time division frames; and said data transfer means comprises means for presenting a variable number of from 0 to n data available prompting pulses on said at least one prompting control line, during each said basic time slot, so as to cause a variable number of from 0 to n bits of data to be transferred bit serially between said system and said buffer means during the respective time slot; wherein the number of prompting pulses presented in any slot is related to the amount of data received in said buffer means, relative to an internal channel to which the respective time slot is assigned, since the last prior recurrence of a time slot assigned to the same internal channel.

4. A BTDM interface according to claim 3 wherein:
said timing means comprises means for selectively generating a short duration transfer enabling signal during each said basic time slot, said signal being active only during a small portion of the respective slot; and
said data transfer means includes means responsive to said enabling signal for carrying out respective said transfers of from 0 to n data bits during the respective basic time slot and only while said enabling signal is coincidentally active.

5. A BTDM interface according to claim 4 wherein said data transfer means comprises;
means coupled to said timing means and said buffer means for receiving and latching all of the data bits to be transferred, said means being conditioned by said timing means to receive and latch said data bits at a predetermined time in each said basic time time shortly preceding activation of said enabling signal; and
means coupled to said timing means and rendered operative when said enabling signal is active for serially transferring the data bits latched by said receiving and latching means to a said data line while presenting prompting pulse signals to said internal channels of said system on said prompting control line indicating that valid data bits are being transferred; said data bits being presented at a rate such that n such bits can be transferred relative to any said internal channel during a single interval of activation of said enabling signal;
said interface further comprising receiving circuit means coupled between said system internal channels and said data transfer and prompting control lines for receiving and latching said data bits presented by said data transfer means in synchronous response to said prompting control signals, and for transferring said latched data bits to said system internal channels for further handling in asynchronous relation to said enabling signal.

6. A BTDM interface according to claim 5 wherein data transferred in said basic time slots represents data formatted in accordance with a plurality of different protocols, and each said system internal channel comprises variably configurable processing means for for processing data furnished by said synchronous receiving means in asynchronous relation to said enabling signals for removing protocol-specific characters.

7. A BTDM interface according to claim 6 wherein:
said data and control lines contain only a single receive data line for transferring data to said internal channels from said data transfer means, and an associated prompting control line for transferring prompting control signals indicating availability of individual data bit signals; and
said synchronous receiving means is required to latch each data bit presented on said RDATA line within a predetermined time of the appearance of the respective prompting control signal on said RDATA VALID line.

8. A BTDM interface according to claim 7 wherein:
said variably configurable processing means includes means coupled to said interface control lines for dynamically reconfiguring processing states of said variably configurable means in synchronism with occurrences of said basic time slots so as to enable said processing means to perform protocol-specific processing tasks on the data transferred during respective slots; and
the short active durations of said enabling signal are designed to allow optimum time for said dynamic reconfiguring within each said basic time slot, so that said internal channels may immediately begin processing data transferred thereto during the basic time slot in which it is received.

9. In a data processing system which receives data from external sources in multiple internal time multiplex channels, a burst time division multiplex interface for isolating time-dependent aspects of said data transfers from the system by confining time-dependent aspects to a relatively small circuit operating between said internal channels and said sources comprising:
a circuit which is relatively small in comparison to said system for receiving data from said external sources;
means, including a plurality of data transfer lines and a plurality of control lines, forming a discrete data transfer interface between said relatively small circuit and said internal channels; said circuit comprising:
first means connected to said data transfer lines for transferring data from said external sources to said internal channels;
second means connected to said control lines and said first means for defining a cyclically recurrent time division frame of N basic time slots (N greater than 2) and for indicating individual time division time slots in each frame, different said time slots being assignable to different ones of said internal channels;
buffer means for storing a predetermined number of up to n data bits relative to each of said time slots, where n is greater than 1 and represents the maximum number of bits which can be received from any of said external sources, in the time duration of a single said frame; and
bit transfer control means connected to said buffer means and said first means for conditioning said first means during each said time slot to transfer to said a variable number of from 0 to n bits from a said external source to an internal channel to which the respective time slot is assigned; wherein the number of bits so transferred invariably constitutes all of the data received from the the respective external source since the last previous occurrence of the corresponding time slot in a previous said frame.

10. A two-tiered interface arrangement, for connecting internal I/O channels of a data processing system with external data communication channels of a data communication network, said arrangement comprising:
a first interface connecting directly to said network, a second interface connecting directly to said internal I/O channels, and data handling circuits connected between said first and second interfaces;
said first interface serving to transfer data signals bit-serially between said external channels of said network and said data handling circuits, with timing of said transferred signals determined by operating characteristics of said network;
said second interface serving to transfer data signals bit-serially between said data handling circuits and said internal I/O channels of said system; timing of data signal transfers at said second interface being controlled by said data handling circuits in a burst time division multiplex mode in which data signals received from said external channels and data signals being forwarded to said network (transmit data) are transferred in bit-serial bursts at said second interface, in cylically recurrent time division frames of N basic time slots assignable to said channels (N greater than 2); basic time slots within each frame being assignable for linking individual said internal channels with individual said external channels, and each time slot being useful to transfer a burst of receive data frame said data handling circuits to a respectively assigned internal time slot, and to transfer a burst of transmit data from a said respectively assigned internal channel to said data handling circuits; said receive and transmit bursts being characterized further in that each contains a varied number of from 0 to n pulses representing data bits;

said data handling circuits comprising:

buffer means connected between said first and second interfaces for storing up to n bits of receive data and up to n bits of transmit data relative to each of said internal channels; where n is so related to the rate of data signal timing in said external channels that each external channel coupled to a said internal channel can not transfer more than n bits of receive data or more than n bits of transmit data in the time between consecutive recurrences of a basic time slot assigned to the respective said internal channel; and means coupled to said buffer means and said second interface for controlling the burst transfers at said second interface so that, in each said basic time slot, all receive data bits accumulated in said buffer means relative to the internal channel respectively assigned to that basic time slot, since the prior recurrence of the same time slot in the immediately preceding time division frame, passed to the respective internal channel assigned to that slot, and so that all transmit data bits accumulated in the respective internal channel during the same interval are passed to said buffer means; whereby the flow of data bits through said buffer means, relative to any said internal channel, is so matched to the timing characteristics of the external channel linked to the respective internal channel that, irrespective of timing differences between the respectively linked internal and external channels, receive data will never overflow the capacity of said buffer means and transmit data will never underflow the transmission capacity of the respective external channel.

11. A two-tiered interface arrangement in accordance with claim 10, in which said first interface is operated in a time division mode, in cyclically repetitive time division frames containing basic time slots corresponding to the basic time slots in said burst time division frames at said second interface, wherein:

the frames and basic time slots at said first and second interfaces recur at respective slightly different rates F1 and F2 (F2 greater than F1) such that the interval between consecutive occurrences of any one of the basic time slots at the second interface is always slightly shorter than the interval between consecutive occurrences of the corresponding basic time slot at the first interface.

12. An interface arrangement in accordance with claim 10, wherein: each said burst transfer of receive data and transmit data, occurring during a said basic time slot at said second interface, is compressed into a short duration fractional portion of the respective basic time slot, whereby the remaining time in the respective basic time slot is available to the respectively assigned internal channel for performing functions requiring synchronism with said basic time slots at said second interface, but not requiring synchronism in relation to instantaneous handling of data bit transfers at said second interface.

13. An interface arrangement in accordance with claim 11 wherein said buffer means comprises:

plural discrete bit storage means reserved relative to said basic time slots at said second interface, each said basic time slot at said second interface having one of said bit storage means reserved exclusively thereto, each said bit storage means comprising means for storing up to n bits of receive data in transit from the network to a said internal channel via the respective basic time slot and up to a n bits of transmit data in transit from the respective internal channel to the network via the respective basic time slot;

plural fullness indicating means associated with respective ones of said bit storage means for indicating the number of receive data bits instantaneously stored in the respective bit storage means relative to the respective basic time at the second interface; and plural vacancy indicating means associated with respective ones of said bit storage means for indicating the number of empty bit storage positions currently available in the respective bit storage means for storing transmit data bits relative to the respective second interface basic time slot; and said means for controlling said burst transfers relative to said second interface comprises:

means for indicating beginnings of individual ones of said basic time slots at said second interface;

means coupled to said beginning of slot indicating means and said fullness indicating means for operating at a predetermined time phase in each basic time slot at said second interface to control shifting of all receive bits instantaneously stored relative to the respective basic time slot over said interface to a respective internal channel of said system assigned to the respective time slot; and means coupled to said beginning of slot indicating means and said vacancy indicating means for operating at a predetermined time phase in each basic time slot at said second interface to control transfer of a number of transmit data bits over said second interface from the respectively assigned internal channel to a vacant portion of the respective bit storage means reserved for storing transmit data, the number so transferred just filling the instantaneously vacant part of the respective bit storage means used for storing transmit data.

14. In a data communication system for operating at a node of a time division multiplex data communication network, said network having a basic time division frame consisting of N slots recurrent at a frequency F1 fixed by communication characteristics of the network, said N slots assignable to N separate data communication channels of said system, said system containing a data link control device having N internal data handling channels, for handling data transfers relative to said network, and circuit means interfacing between said device and said network, an interface arrangement between said circuit means and said device comprising:

timing means in said circuit means for presenting timing signals to said device defining a time multiplex frame of N basic slots recurrent at a frequency F2 equal to or greater than F1;

data transfer control means in said circuit means for operating during each said basic time slot to present a variable number of from 0 to n data transfer control signals to said device, for conditioning said device for a bit-serial transfer of from 0 to n bits of data during the respective basic time slot, where n is greater than 2;

data buffer means in said circuit means for storing data in transit between said network and any said internal channel of said device, between consecutive recurrences of a said basic time slot assigned to the respective internal channel, said data buffer means having capacity for storing at least n bits of data flowing from the network to any said internal channel and up to n bits of data flowing from the same internal channel to said network; where n represents the maximum number of bits which can be presented by said network relative to each internal channel, in the time between consecutive recurrences of a basic time slot assigned to the respective internal channel, and n also represents the maximum number of bits which can be transmitted on the network, relative to the respective internal channel, in the said time between consecutive basic time slot recurrences; and control means coupled to said buffer means and said data transfer control means for operating said control means during each basic time slot, in time coordination with the occupancy state of said data buffer means relative to a respective said internal channel, whereby the number of bits transferred between any internal channel of said device and said data buffer means during a respective basic time slot is a predetermined function of the occupancy state of the buffer relative to the transmission capacity of the network allocated to the respective internal channel.

15. An interface arrangement according to claim 14 wherein:

said circuit means and device are adapted for handling bidirectional transfers of receive data bits and transmit data bits relative to individual ones of said internal channels during basic time slots respectively assigned to said internal channels; where receive data bits are data bits received from said network for transfer to internal channels of said device and transmit data bits are data prepared in said device internal channels for transmittal to said network;

said data buffer means is capable of storing up to n bits of receive data and up to n bits of transmit data relative to each of said N slots;

said data buffer means includes means for indicating the number of receive data bits instantaneously stored relative to each said basic time slot and the number of vacant bit positions instantaneously available for storage of transmit data bits relative to each said basic time slot;

said data transfer control means is adapted for conditioning said device for conducting from 0 to n transfers of receive data bits and from 0 to n transfers of transmit data bits relative to said buffer means during any basic time slot; and said control means includes means responsive to number indications from said indicating means for operating said data transfer control means during each basic time slot to condition said device to receive a number of receive data bits from said data buffer means corresponding to the number of receive data bits currently indicated by said indicating means as stored relative to a said internal channel respectively assigned to said slot, and to further condition said respectively assigned internal channel to transfer to said data buffer means a number of transmit data bits corresponding to the number of vacant transmit buffer bit positions indicated by said indicating means relative to the respective internal channel.

16. An interface arrangement according to claim 15 wherein:

the value of n is so related to the rate of data bit transmission at the network interface of said circuit means that the number of receive data bits entered into said buffer means relative to any said basic time slot during a frame of recurrence of the respective basic time slot can not exceed n, and the number of transmit bits required to be transferred to the network from the buffer means relative to the same slot also can not exceed n.

17. An interface arrangement according to claim 16:

F2 is slightly greater than F1; whereby the number of receive bits accumulated in the data buffer means relative to any slot at the intermediate interface can not be greater than the number of receive bits transferred to said device during the respective slot, regardless of any timing variations at the network interface of said circuit means due to relative drifts between local and remote timing circuits in the network.

18. An interface arrangement according to claim 14 wherein:

operations of said data transfer control means during any slot are restricted to occur only during a small portion of the slot interval, thereby allowing a major portion of the slot period to be used in said internal channels of said device for processing data relative to said interface, and for changing processing states relative to the slots so that processing can be conducted with reduced time dependencies relative to internal channels operating with different protocols.

19. In a data communication network including data processing nodes at which data communicated over said network is processed by data processing systems, and at which data is passed between the network and individual processing systems via tandem stages of layer 1 (L1) circuits and layer 2 (L2) processing devices; each L1 circuit stage interfacing directly to a respective node of the network, and each L2 device stage coupling a respective L1 circuit stage to a respective data processing system; the device in each said L2 stage having plural internal data transfer channels operated in a cyclic time division mode; a burst time division multiplex interface formed between respective said L1 and L2 stages for isolating said L2 stages from time-dependent data signalling processes in said network; said interface comprising:

a plurality of data and control lines extending between said respective L1 and L2 stages so as to provide a discrete physical path between said stages for transferring data bit-serially and bidirectionally between said stages and through said stages between respective said network nodes and respective said processing systems;

timing means in each said L1 stage for generating timing signals relative to said selected ones of said control lines for defining beginnings of individual time slots within a cyclically recurrent time division frame of N slots (N greater than 2); said time slots being assignable to said internal channels of the respective L2 device stage for handling data in transit between said respective L1 stage and processing system; said data in transit through each said internal channel constituting data being transmitted between the respective internal channel and a respective external communication channel in said network, and between the said respective internal channel and the respective data processing system;

first transfer control means in said L1 stage for presenting first and second time overlapped bursts of pulse signals to said device in each said time slot, wherein each pulse in said first burst indicates readiness of said L1 stage to send a bit of data to a respective internal channel in the respective L2 stage, and each pulse in said second burst indicates readiness of said L1 stage to receive a bit of data from the respective internal channel in said L2 stage; wherein the number of pulses in each first and second burst ranges variably from 0 to n pulses, where n is greater than 2, and said L1 and L2 stages being adaptive to handle transfers of n bits of data in each direction of communication during any slot; and means in each said L2 stage device responsive to each said readiness pulse indication in said first and second bursts for respectively receiving and sending a data bit signal relative to said L1 device stage in synchronous time relation to the respective readiness indicating signal.

20. A burst time division interface in accordance with claim 19 wherein:

said L1 stage comprises buffer means for storing up to n receive data bits relative to each slot for transfer from the network to the L2 stage in the channel associated with the respective slot, and for storing up to n transmit data bits relative to each slot for transfer from the L2 stage to the network in a channel associated with the respective slot; and n represents the maximum number of bits which can be received from the network and transferred to the network in any said channel between consecutive occurrences of a slot assigned to that channel.

21. A burst time division interface in accordance with claim 20 wherein said first and second bursts are timed to occur during a small time window within each slot.

22. A burst time division interface in accordance with claim 21 wherein said time window is fixed in position close to the end of each slot.

23. An interface according to claim 22 wherein the interface between said L1 stage and the network is operated in a time division mode with slots and frames corresponding to those at the burst interface between the L1 and L2 stages, and wherein the frame and slot recurrence frequencies at the L1 to L2 interface are slightly faster than those at the L to network interface, whereby the data transfers across the L1 to L2 interface are always leading respective transfers at the L1 to network interface in time so that regardless of time dependencies incurred at the L1 to network interface due to drifting of remote network clocks the numbers of bits transferred to said buffer means relative to any one channel during one period of recurrence of the respective slot at the L1 to L2 interface can not exceed n.

24. An interface according to claim 23 wherein the data being transferred over said interface in different said channels may be variously configured in accordance with various data communication protocols and said L2 device comprises means coupled to said interface timing control lines for reconfiguring the L2 device and varying its processing state in synchronism with said time slots, and wherein the short timing of said burst window affords optimum time for operation of said reconfiguring and state varying means without interference to data transfers executed during the bursts.

25. An interface according to claim 24 wherein said L2 device comprises plural-stage processing pipelines required to operate in synchronism with said slots, wherein states of individual pipeline stages have to be manipulated by said reconfiguring and state varying means, and wherein the short timings of said burst windows afford optimum time for manipulation of states in all of said pipeline stages without interference between such manipulation and data transfer processes occurring during said bursts.

* * * * *